United States Patent
Takeuchi et al.

(10) Patent No.: US 6,411,856 B1
(45) Date of Patent: Jun. 25, 2002

(54) GENERAL OPERATION INTEGRATED CONTROL METHOD AND ITS CONTROLLER

(75) Inventors: Hisashi Takeuchi; Takayoshi Takahara; Yasunobu Sakai, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/254,238

(22) PCT Filed: Sep. 3, 1997

(86) PCT No.: PCT/JP97/03084

§ 371 (c)(1),
(2), (4) Date: Mar. 2, 1999

(87) PCT Pub. No.: WO98/10516

PCT Pub. Date: Mar. 12, 1998

(30) Foreign Application Priority Data

Sep. 4, 1996 (JP) .............................................. 8-234276

(51) Int. Cl.⁷ .......................... G05B 19/18; G06F 15/16
(52) U.S. Cl. ................... 700/3; 700/2; 709/209
(58) Field of Search ................. 700/2–4, 8, 9, 700/11; 702/188; 709/208, 209, 244; 340/825.06, 825.22

(56) References Cited

U.S. PATENT DOCUMENTS 5,329,579 A * 7/1994 Brunson ....................... 379/88
5,729,686 A * 3/1998 Heck et al. ................. 395/200
6,016,518 A * 1/2000 Matsushima et al. .......... 710/8
6,192,397 B1 * 2/2000 Thompson ................... 709/209

FOREIGN PATENT DOCUMENTS

JP    9-83330    3/1997

OTHER PUBLICATIONS

Pearlman, R., "About Bridge and Router Interconnections," Tokyo: Soft Bank K.K., pp. 54–59, (May 31, 1995).

* cited by examiner

Primary Examiner—Leo Picard
Assistant Examiner—Elliott Frank
(74) Attorney, Agent, or Firm—Foley & Lardner

(57) ABSTRACT

A control unit (38) provided on each of a plurality of operating units for integrating the whole of such an operating unit group that operating units performing a certain operation plurally aggregate and making the same perform regularly operation control includes a signal transmission part (33 and 34) and a signal receiving part (35 and 36) for communicating with the adjacent operating unit, and a connection determination part (37) determining whether or not it is located on a predetermined start position forming a start point of integrated control in the operating unit group on the basis of relative positional relation obtained as a result of performing a communicating operation for deciding the operating unit as a master operating unit when determined as located on the start position while deciding it as a dependently operating slave operating unit when determined as not located on the start position. Thus, an operation integrated control method in which the operating unit can determine whether it is the master operating unit or the slave operating unit itself and a control unit therefor are provided.

12 Claims, 19 Drawing Sheets

| SIGNAL RECEIVING PART 35 | ABSENT | ABSENT | PRESENT | PRESENT |
| --- | --- | --- | --- | --- |
| SIGNAL RECEIVING PART 36 | ABSENT | PRESENT | ABSENT | PRESENT |
| MASTER/SLAVE | MASTER | SLAVE | MASTER | SLAVE |
| PRESENCE/ABSENCE OF SERIES CONNECTION | ABSENT | ABSENT | PRESENT | PRESENT |

FIG.10A

| PROJECTOR | 101A | 102A | 103A | 104A | 105A | 106A | 107A | 108A | 109A |
|---|---|---|---|---|---|---|---|---|---|
| SIGNAL RECEIVING PART 35 | ABSENT | ABSENT | ABSENT | PROJECTOR SIGNAL | PROJECTOR SIGNAL | PROJECTOR SIGNAL | PHOTORECEIVER SIGNAL | PHOTORECEIVER SIGNAL | PHOTORECEIVER SIGNAL |
| SIGNAL RECEIVING PART 36 | ABSENT | PROJECTOR SIGNAL | PHOTORECEIVER SIGNAL | ABSENT | PROJECTOR SIGNAL | PHOTORECEIVER SIGNAL | ABSENT | PROJECTOR SIGNAL | PHOTORECEIVER SIGNAL |
| MASTER/SLAVE | MASTER | SLAVE | ERRONEOUS CONNECTION | MASTER | SLAVE | ERRONEOUS CONNECTION | MASTER | SLAVE | ERRONEOUS CONNECTION |
| PRESENCE/ABSENCE OF SERIES CONNECTION | ABSENT | ABSENT | ABSENT | PRESENT | PRESENT | PRESENT | ERRONEOUS CONNECTION | ERRONEOUS CONNECTION | ERRONEOUS CONNECTION |

FIG.10B

| PHOTORECEIVER | 101B | 102B | 103B | 104B | 105B | 106B | 107B | 108B | 109B |
|---|---|---|---|---|---|---|---|---|---|
| SIGNAL RECEIVING PART 35 | ABSENT | ABSENT | ABSENT | PROJECTOR SIGNAL | PROJECTOR SIGNAL | PROJECTOR SIGNAL | PHOTORECEIVER SIGNAL | PHOTORECEIVER SIGNAL | PHOTORECEIVER SIGNAL |
| SIGNAL RECEIVING PART 36 | ABSENT | PROJECTOR SIGNAL | PHOTORECEIVER SIGNAL | ABSENT | PROJECTOR SIGNAL | PHOTORECEIVER SIGNAL | ABSENT | PROJECTOR SIGNAL | PHOTORECEIVER SIGNAL |
| MASTER/SLAVE | MASTER | ERRONEOUS CONNECTION | SLAVE | MASTER | ERRONEOUS CONNECTION | SLAVE | MASTER | ERRONEOUS CONNECTION | SLAVE |
| PRESENCE/ABSENCE OF SERIES CONNECTION | ABSENT | ABSENT | ABSENT | ERRONEOUS CONNECTION | ERRONEOUS CONNECTION | ERRONEOUS CONNECTION | PRESENT | PRESENT | PRESENT |

FIG. 16A

| PROJECTOR | 121A | 122A | 123A | 124A | 125A | 126A | 127A | 128A | 129A |
|---|---|---|---|---|---|---|---|---|---|
| SIGNAL RECEIVING PART 35 | ABSENT | ABSENT | ABSENT | PROJECTOR SIGNAL | PROJECTOR SIGNAL | PROJECTOR SIGNAL | PHOTORECEIVER SIGNAL | PHOTORECEIVER SIGNAL | PHOTORECEIVER SIGNAL |
| SIGNAL RECEIVING PART 36 | ABSENT | PROJECTOR SIGNAL | PHOTORECEIVER SIGNAL | ABSENT | PROJECTOR SIGNAL | PHOTORECEIVER SIGNAL | ABSENT | PROJECTOR SIGNAL | PHOTORECEIVER SIGNAL |
| MASTER/SLAVE | MASTER | SLAVE | SLAVE | MASTER | SLAVE | SLAVE | MASTER | SLAVE | SLAVE |
| PRESENCE/ABSENCE OF SERIES CONNECTION | ABSENT | ABSENT | ABSENT | PRESENT | PRESENT | PRESENT | ERRONEOUS CONNECTION | ERRONEOUS CONNECTION | ERRONEOUS CONNECTION |

FIG. 16B

| PHOTORECEIVER | 121B | 122B | 123B | 124B | 125B | 126B | 127B | 128B | 129B |
|---|---|---|---|---|---|---|---|---|---|
| SIGNAL RECEIVING PART 35 | ABSENT | ABSENT | ABSENT | PROJECTOR SIGNAL | PROJECTOR SIGNAL | PROJECTOR SIGNAL | PHOTORECEIVER SIGNAL | PHOTORECEIVER SIGNAL | PHOTORECEIVER SIGNAL |
| SIGNAL RECEIVING PART 36 | ABSENT | PROJECTOR SIGNAL | PHOTORECEIVER SIGNAL | ABSENT | PROJECTOR SIGNAL | PHOTORECEIVER SIGNAL | ABSENT | PROJECTOR SIGNAL | PHOTORECEIVER SIGNAL |
| PRESENCE/ABSENCE OF SERIES CONNECTION | ABSENT | ABSENT | ABSENT | ERRONEOUS CONNECTION | ERRONEOUS CONNECTION | ERRONEOUS CONNECTION | PRESENT | PRESENT | PRESENT |
| NORMAL/ERRONEOUS CONNECTION | ERRONEOUS CONNECTION | NORMAL | NORMAL | ERRONEOUS CONNECTION | NORMAL | NORMAL | ERRONEOUS CONNECTION | NORMAL | NORMAL |

GENERAL OPERATION INTEGRATED CONTROL METHOD AND ITS CONTROLLER

TECHNICAL FIELD

The present invention relates to a control method and a control unit therefor, and more particularly, it relates to a general operation control method in which a group of operating units performing a certain operation are managed to perform regular operation control following a prescribed rule, and a control unit therefor.

BACKGROUND ART

Referring to drawings, a conventional general operation control method and a control unit therefor are now described with reference to a multi-optical axis photoelectric switch.

A multi-optical axis photoelectric switch has generally been employed as a safety for a press machine or as an intrusion warning unit in a dangerous zone. Such a multi-optical axis photoelectric switch is structured as follows: A projector having a plurality of projective elements and a photoreceiver having a plurality of photodetectors corresponding to the respective ones of the plurality of projective elements are arranged to oppose each other. Optical axes are formed between the respective ones of these plurality of projective elements and plurality of photodetectors, whereby a number of optical axes (optical paths) are formed between the projector and the photoreceiver. A detection area is set between the projector and the photoreceiver, the plurality of projective elements are successively rendered to emit light, and photoreceiving operations are performed by the photodetectors corresponding to the respective projective elements in a state synchronized with the projection timings. In the multi-optical axis photoelectric switch, photoreceiving signals by the photodetectors disappear when a light intercepting object is present in the detection area, and hence an object detection signal can be outputted by determining light intercepted states of the optical axes on the basis thereof. In a place where the multi-optical axis photoelectric switch is used, a press unit is stopped, or an intruder into a dangerous zone in a factory is detected and a warning is issued on the basis of such an object detection signal, for preventing an accident.

In such a multi-optical axis photoelectric switch, a synchronous signal transmitted from the projector to the photoreceiver is employed for synchronizing the timings of projecting operations and the timings of the photoreceiving operations. Such a synchronous signal may be transmitted from the photoreceiver to the projector. As transmission means for the synchronous signal, an electric one employing a wire, or an optical one employing light may be employed.

A specific example of the structure of the multi-optical axis photoelectric switch is now described. FIG. 20 is a block diagram showing the structure of a multi-optical axis photoelectric switch. Referring to FIG. 20, this multi-optical axis photoelectric switch is structured by a pair of projector 1 and photoreceiver 2. The projector 1 includes a sequential projection circuit 3, a timing circuit 4, and a plurality of projective elements 101 to 106. The photoreceiver 2 includes a photoreceiving selection circuit 6, a timing circuit 5, a plurality of photodetectors 201 to 206, an amplifier circuit 7, a microcomputer 8 and an output circuit 9.

The projective elements 101 to 106, each formed by a light emitting diode or a laser diode, successively perform projection one by one. The photodetectors 201 to 206 are arranged opposing to corresponding ones of the respective projective elements 101 to 106, and receive light projected from the corresponding projective elements. Each of the photodetectors 201 to 206, formed by a photodiode or a phototransistor, converts the received light to an electric signal and outputs the same. The projective elements 101 to 106 and the photodetectors 201 to 206 are provided in a one-to-one basis, and the corresponding projective elements and photodetectors are arranged opposed to each other at a prescribed distance in a detection area. Adjacent projective elements and the adjacent photodetectors are each arranged at prescribed intervals. A plurality of optical axes (optical paths) are formed by such a plurality of projective elements 101 to 106 and plurality of photodetectors 201 to 206.

The timing circuit 4 supplies a timing signal defining a projection timing to the sequential projection circuit 3, while supplying a synchronous signal for synchronizing a projecting operation and a photoreceiving operation to the timing circuit 5. The sequential projection circuit 3 is a circuit for successively driving the projective elements 101 to 106 one by one, and drives the projective elements 101 to 106 by successively feeding a driving current to the projective elements 101 to 106 in response to the timing signal received from the timing circuit 4.

The timing circuit 5 supplies a timing signal defining a photoreceiving timing to the photoreceiving selection circuit 6 in synchronization with the synchronous signal received from the timing circuit 4, while supplying a signal indicating the photoreceiving timing to the microcomputer 8. The photoreceiving selection circuit 6 is a circuit for performing selective control of photoreceiving by the photodetectors 201 to 206, and performs the following operation: The photoreceiving selection circuit 6 selects, in synchronization with a projective element performing a projecting operation, the corresponding photodetector on the basis of the timing signal supplied from the timing circuit 5, and operates the photodetector to a photodetectable state. Thus, the corresponding projective elements and photodetectors successively perform projection and photoreceiving pair by pair. Further, the photoreceiving selection circuit 6 receive a photoreceiving signal supplied in response to photoreception by the photodetectors 201 to 206, and supplies the photoreceiving signal to the amplifier circuit 7.

The amplifier circuit 7 amplifies the photoreceiving signal supplied from the photoreceiving selection circuit 6, converts the amplified signal from an analog signal to a digital signal and supplies the same to the microcomputer 8. The microcomputer 8 compares the level of the supplied photoreceiving signal with a prescribed reference level, and determines whether or not an object has been detected, on the basis of the comparison result. In other words, the microcomputer 8 makes a determination that presence of an object is not detected when the level of the photoreceiving signal is in excess of the reference level, while making a determination that presence of an object has been detected when the level of the photoreceiving signal is lower than the reference level. The microcomputer 8 supplies a signal indicating such a determination result to the output circuit 9. The output circuit 9 outputs an object detection signal capable of indicating presence/absence of existence of an object in response to the signal supplied from the microcomputer 8. This object detection signal is employed for operations of various types of units in the aforementioned object detection.

When a plurality of such multi-optical axis photoelectric switches where projectors and photoreceivers are paired are used, there is a possibility of mutual interference, resulting in an erroneous detection, if the multi-optical axis photoelectric switches are arranged in such a manner that the photoreceiver of a certain multi-optical axis photoelectric switch possibly receives light emitted from the projector of another multi-optical axis photoelectric switch. The mutual interference in this case stands for the following phenomenon: When the projectors simultaneously perform projecting operations in the respective ones of two multi-optical axis photoelectric switches, for example, the photoreceiver in one multi-optical axis photoelectric switch may receive light emitted by the projector in the other multi-optical axis photoelectric switch. In such a case, it is possible that an object actually present is not detected, since light emitted by the projector of one multi-optical axis photoelectric switch enters the photoreceiver of the other multi-optical axis photoelectric switch although a light intercepting state is caused by the object between the projector and the photoreceiver of the one multi-optical axis photoelectric switch. Such a phenomenon in that projected light beams mutually interfere between a plurality of multi-optical axis photoelectric switches is called mutual interference.

As a method of preventing such mutual interference, there is a method of adjusting projection timings of multi-optical axis photoelectric switches so that the projection timings do not coincide between a plurality of multi-optical axis photoelectric switches. Specifically, there is a control method of connecting a plurality of multi-optical axis photoelectric switches by a wire and transmitting a signal indicating the projection timing of a certain multi-optical axis photoelectric switch among the plurality of multi-optical axis photoelectric switches having the possibility of performing projection at the same time to another multi-optical axis photoelectric switch, so as to shift the projection timing so that the projection timing does not coincide with the other multi-optical axis photoelectric switch. In this case, the multi-optical axis photoelectric switch transmitting the signal indicating the projection timing is called a master multi-optical axis photoelectric switch, and the multi-optical axis photoelectric switch receiving the signal is called a slave multi-optical axis photoelectric switch. In other words, the master stands for a sensor controlling an operation start timing among the connected multi-optical axis photoelectric switches, and the slave stands for a sensor operating dependently on the master.

As a method of preventing mutual interference, there is also a method of adjusting setting of the frequency of a signal defining a projection timing by a setter such as a dip switch so that projection timings do not coincide among a plurality of multi-optical axis photoelectric switches.

An exemplary structure of a group of multi-optical axis photoelectric switches structured by connecting a plurality of multi-optical axis photoelectric switches is now described. FIG. 21 is a front elevational view of series-connected conventional multi-optical axis photoelectric switches. Referring to FIG. 21, a sensor 131 including a projector 131a and a photoreceiver 131b and a sensor 132 including a projector 132a and a photoreceiver 132b are connected in series. Here, an object detection signal is outputted from only one photoreceiver 131b. Such a series connection system is utilized not only for prevention of mutual interference but also for setting a non-detection area performing no detection of an object, and for creating an L-shaped structure setting a detection area in an L shape. Such a sensor connected in series is called an extension unit. This extension unit is connected to a multi-optical axis photoelectric switch that by itself functions as a sensor, and used for enlargement of the detection area, and the unit does not by itself attain the function of the sensor. When employing the series connection system, therefore, it is necessary to fabricate an extension unit independently of a multi-optical axis photoelectric switch functioning by itself as a sensor, and hence the fabrication cost for the sensor increases. When individual multi-optical axis photoelectric switches and extension units are used in combination and variations as to a detection area and detectability (the detectability depends on the distance between projective elements) of sensors are to be made, it is necessary to additionally increase the types of the sensors in consideration of the extension unit. Thus, there is such a problem that, when fabricating a multi-optical axis photoelectric switch and an extension unit, the fabrication cost for a sensor inclusive of the cost for inventory thereof further increases.

FIG. 22 is a front elevational view of multi-optical axis photoelectric switches having a structure for preventing mutual interference, employing dip switches. Referring to FIG. 22, each of a sensor 141 including a projector 141a and a photoreceiver 141b and a sensor 143 including a projector 143a and a photoreceiver 143b prevents mutual interference by changing frequency setting of projection timings by a dip switch 142 provided on each projector. FIG. 22 shows an example of preventing mutual interference between parallel-connected multi-optical axis photoelectric switches. This parallel connection is a connection system in which a plurality of multi-optical axis photoelectric switches individually outputting object detection signals are connected with a wire. The parallel connection is effective where multi-optical axis photoelectric switches are employed for a plurality of machines (press machines etc.) whose detection areas are different. On the contrary, series connection is effective where a plurality of multi-optical axis photoelectric switches are employed for a detection area of one machine.

Specific examples of use of multi-optical axis photoelectric switches are now described. FIG. 23A and FIG. 23B are perspective views illustrating specific examples of use of multi-optical axis photoelectric switches.

In FIG. 23A, there is shown an example of use of series-connected multi-optical axis photoelectric switches. A plurality of multi-optical axis photoelectric switches formed by projectors 10a and photoreceivers 10b are series-connected in a manner surrounding a working area on the front side of a working unit 50 performing an operation such as material processing. In this case, an object detection signal is outputted from one photoreceiver no matter which multi-optical axis photoelectric switch detects an object. In this case, an object to be detected intruding into one working area of one working unit is detected by a plurality of multi-optical axis photoelectric switches, and hence the series connection system is suitable. This is because one object detection signal is sufficient since the working unit 50 is at a risk no matter which detection area the object intrudes.

In FIG. 23B, there is shown an example of use of multi-optical axis photoelectric switches where working units are set in parallel. A multi-optical axis photoelectric switch is provided on the front side of each of two working units 51 and 52 individually performing an operation such as material processing. A multi-optical axis photoelectric switch formed by a projector 11a and a photoreceiver 11b is provided on the side of the working unit 51 in a manner surrounding a working area. A multi-optical axis photoelectric switch formed by a projector 13a and a photoreceiver 13b is provided on the side of the working unit 52 in a manner surrounding a working area.

When performing detection of an object by means of a group of multi-optical axis photoelectric switches structured by series-connecting such multi-optical axis photoelectric switches or the like, operations of a plurality of multi-optical axis photoelectric switches are generally controlled in a collective manner.

When operations are to be controlled in the general, collective manner in a group of operation units formed by a plurality of operating units such as in the case of the group of multi-optical axis photoelectric switches, the aforementioned connection of the operating units and setting of master/slave have been performed.

In a control unit performing general operation control of a plurality of operating units such as the aforementioned multi-optical axis photoelectric switches, it is necessary to adjust setting of the frequency of a signal defining a projection timing by a set switch such as a dip switch in order to prevent mutual interference for the operating units provided in a parallel direction. In order to prevent mutual interference among a number of multi-optical axis photoelectric switches, therefore, the same number of set switches are required, and a set operation for preventing mutual interference is extremely complicated. There has been such a problem that a complicated setting operation possibly leads to erroneous setting. Further, it has been possible to parallel-connect up to only two pairs of multi-optical axis photoelectric switches when the multi-optical axis photoelectric switches are to be connected in parallel by means of a wire. When performing connection employing an extension unit as described above, there has been such an additional problem that the extension unit can be employed only for series connection providing limited versatility. When employing the extension unit, further, there has been such a problem that the fabrication cost increases for the aforementioned reason.

The present invention has been proposed in order to solve the aforementioned problems. An object of the present invention is, when a control unit is provided on each of a plurality operating units for generally controlling a group of a plurality of operating units performing a certain operation to enable regular operation control, to provide a control unit which can by itself determine whether it is a master operating unit or a slave operating unit and can improve convenience for the user.

Still another object of the present invention is to provide a control unit which can improve the degree of freedom in changing a manner of connection of an operating unit group and the degree of freedom in expanding operating units.

A further object of the present invention is to provide a control unit which can communicate with an adjacent operating unit.

A further object of the present invention is to provide a control unit which can determine whether or not a manner of serial or parallel connection with an operating unit as an object of connection is an erroneous connection.

A further object of the present invention is to provide a control unit which can make determinations as to whether or not an operating unit provided with the control unit for general operation control of an operating unit group is connected with other operating units on a higher side and a lower side of control order.

A further object of the present invention is to provide a control unit which can, when performing general operation control of an operating unit group, make a determination as to whether operating units are connected in series or connected in parallel.

A further object of the present invention is to provide a control unit which can, when performing general operation control of an operating unit group, decide a master operating unit on the basis of connection states to a higher side and a lower side of the operating unit.

A further object of the present invention is, when performing general operation control of an operating unit group, to make it possible to transmit a control signal in accordance with the manner of series or parallel connection to another operating unit connected to an operating unit.

A further object of the present invention is to provide a control unit which can, when performing general operation control of an operating unit group, determine whether each of the operating units of the operating unit group is a master operating unit or a slave operating unit.

DISCLOSURE OF THE INVENTION

The present invention is directed to a control unit provided, in order to generally control a group of a plurality of operating units performing a certain operation formed connectable in series or in parallel as a whole to enable regular operation control, on each of said plurality of operating units, said control unit including: a communication part for communicating with the adjacent operating unit; a start position determination part for determining whether or not the operating unit is located on a predetermined start position as the most significant position of control order in the series connection or the parallel connection serving as a start point of general control in the operating unit group on the basis of relative positional relation obtained as a result of performing a communicating operation by the communication part; and a master/slave decision part for deciding the operating unit provided with the control part to be a master operating unit when it is determined by the start position determination part that it is located on the start position and deciding the operating unit provided with the control part to be a slave operating unit operating dependently on the master operating unit when it is determined by the start position determination part that it is not located on the start position.

The certain operation in this case means an operation including a detecting operation of a sensor or the like, for example. General control in this case means that a part of the operating unit group collectively controls/drives the group as a whole, for example. To communicate with the adjacent operating unit in this case means to mutually exchange signals between connected adjacent operating units by a method such as transmission/reception of the signals, for example. The start position in this case means a position serving as a prescribed reference as the most significant position of control order in series connection or parallel connection, such as a start position of general operation control or the like. A rule in this case means a rule predetermined in relation to an operation of successively driving the operating unit group, for example. Basically, these interpretations are similarly applicable to the invention of the aspects described below.

Thus, communication is made by the communication part with the adjacent operating unit. Whether or not the unit is located on the predetermined start position serving as the start point of general control in the operating unit group is determined by the start position determination part on the basis of the relative positional relation obtained as the result of the communicating operation by the communication part. The operating unit provided with the control unit is decided to be the master operating unit when it is determined by the start position determination part that it is located on the start position, and the operating unit provided with the control unit is decided to be the slave operating unit operating dependently on the master operating unit when it is determined by the start position determination part that it is not located on the start position.

Therefore, each operating unit belonging to the operating unit group can determine whether it is a master operating unit or a slave operating unit itself Therefore, it is unnecessary for the user to perform setting as to master/slave for each operating unit. Thus, the convenience for the user can be improved. Further, each operating unit can determine whether it is a master operating unit or a slave operating unit on the basis of the relative positional relation to the adjacent operating unit, whereby each operating unit can be a master operating unit as well as a slave operating unit in accordance with the relative positional relation. Therefore, the degree of freedom in changing the manner of connection of the operating unit group and the degree of freedom expanding the operating units can be improved.

The communication part includes a first signal output part outputting a first signal toward the control unit of an operating unit connectable in series, a second signal output part outputting a second signal toward the control unit of an operating unit connectable in series or in parallel, a first signal input part receiving, when connected in series to the control unit of an operating unit as the object of connection, the first signal from the control unit, and a second signal input part receiving, when connected in series or in parallel with the control unit of an operating unit as the object of connection, the second signal from the control unit, the start position determination part determines whether or not the first signal input part has received the first signal and determines whether or not the second signal input part has received the second signal, and the master/slave decision part decides either a master operating unit or a slave operating unit on the basis of the determination result of the start position determination part.

Therefore, each operating unit can communicate with the connectable adjacent operating unit employing two types of signals. Thus, each operating unit itself can determine whether it is a master operating unit or a slave operating unit. Further, the operating unit can be employed for both series connection and parallel connection, and requires no separate part such as an extension unit dedicated to series connection. Thus, it is possible to provide an operating unit having high versatility, which can decrease inventory.

Further, the start position determination part further makes a determination of the type of the signal received by the first signal input part, and further makes a determination of the type of the signal received by the second signal input part. In addition, it includes an erroneous connection determination part making a determination as to whether or not erroneous connection is present in the manner of connection with the control unit of the operating unit as the object of connection, on the basis of the determination result of the signal received by the first signal input part and the determination result of the signal received by the second signal input part. Thus, determinations of the types of the received signals are further made, and a determination is made as to whether or not erroneous connection is present in the manner of connection with the control unit of the operating unit as the object of connection, on the basis of the determination results.

Therefore, each operating unit can determine, by itself, whether or not the state of serial or parallel connection with the operating unit as the object of connection is erroneous connection. Therefore, the user can readily find erroneous connection of such an operating unit group that includes a plurality of operating units, whereby the convenience for the user is improved and the safety can be improved.

According to another aspect, the present invention is directed to a control unit provided, in order to generally control a group of a plurality of operating units performing a certain operation formed connectable in series or in parallel as a whole to enable regular operation control in accordance with a prescribed control order, on each of said plurality of operating units, said control unit including:

a first transmitting/receiving part connectable to the operating unit on a higher side of said control order for performing transmission/reception of a signal to/from the operating unit on the higher side; a second transmitting/receiving part connectable to the operating unit on a lower side of said control order for performing transmission/reception of a signal to/from the operating unit on the lower side; and a determination part for determining whether or not the unit is connected with the operating unit on the higher side on the basis of a manner of reception of the signal by said first transmitting/receiving part and determining whether or not the unit is connected with the operating unit on the lower side on the basis of a manner of reception of the signal by said second transmitting/receiving part.

According to such a control unit, signals are transmitted/received to/from the operating units on the higher side and the lower side of the control order for determining whether or not it is connected with the operating unit on the higher side on the basis of the manner of reception, and determining whether or not it is connected with the operating unit on the lower side on the basis of the manner of reception of the signal by the second transmitting/receiving part. Therefore, it is possible to make determinations as to whether or not the operating unit provided with the control unit for performing general operation control of the operating unit group is connected with other operating units on the higher side and the lower side of the control order.

When the plurality of operating units are connectable in series and in parallel, the determination part further makes determinations as to whether the operating units connected to the respective ones of the higher side and the lower side of the control order are connected in series or connected in parallel, on the basis of the manner of reception of the signals by the first and second transmitting/receiving parts. In this case, the determination is made as to whether the operating units connected to the respective ones of the higher side and the lower side are connected in series or connected in parallel on the basis of the manner of reception of the signals received from the operating units on the higher side and the lower side of the control order, whereby the determination as to whether the operating units are connected in series or connected in parallel can be made when performing general operation control of the operating unit group.

According to still another aspect, the present invention is directed to a control unit provided, in order to generally control a group of a plurality of operating units performing a certain operation as a whole to enable regular operation control in accordance with a prescribed control order, on each of said plurality of operating units, said control unit including: a first transmitting/receiving part connectable to the operating unit on a higher side of said control order for performing transmission/reception of a signal to/from the operating unit on the higher side; a second transmitting/receiving part connectable to the operating unit on a lower side of said control order for performing transmission/ reception of a signal to/from the operating unit on the lower side; and a determination part for determining whether or not the unit is connected with the operating unit on the higher side on the basis of a manner of reception of the signal by said first transmitting/receiving part and determining whether or not the unit is connected with the operating unit on the lower side on the basis of a manner of reception of the signal by said second transmitting/receiving part.

According to such a control unit, the signals are transmitted/received to/from the operating units on the higher side and the lower side of the control order for determining whether or not it is connected with the operating unit on the higher side on the basis of the manner of reception, and determining whether or not it is connected with the operating unit on the lower side on the basis of the manner of reception of the signal by the second transmitting/receiving part. Therefore, it is possible to make determinations as to whether or not the operating unit provided with the control unit for performing general operation control of the operating unit group is connected with other operating units on the higher side and the lower side of the control order.

Further included are: a start position determination part determining whether or not it is located on a predetermined start position serving as a start point of general control in the operating unit group on the basis of the determination result by the determination part as to whether or not it is connected with the operating unit on the higher side, and a master/slave decision part deciding the operating unit provided with the control unit to be a master operating unit when it is determined by the start position determination part that it is located on the start position and deciding the operating unit provided with the control unit to be a slave operating unit operating dependently on the master operating unit when it is determined by the start position determination part that it is not located on the start position. Thus, whether or not it is located on the predetermined start position serving as the start point of integrated control can be determined on the basis of the manner of reception of the signals received from the operating units on the higher side and the lower side of the control order, whereby the master operating unit can be decided on the basis of the connection states of the operating unit to the higher side and the lower side when performing general operation control of the operating unit group.

According to a further aspect, the present invention is directed to a control unit provided, in order to generally control a group of a plurality of operating units performing a certain operation as a whole to enable regular operation control, on each of said plurality of operating units, said control unit including: a control signal transmitting part for transmitting a control signal for performing said general operation control to another connected operating unit, wherein said control signal transmitting part transmits a first control signal for performing said general operation control when said another operating unit is connected in series and transmits a second control signal for performing said general operation control when said another operating unit is connected in parallel.

In this case, a signal for commanding an operation of the other operating unit connected in series, for example, is included in the first control signal for performing integrated operation control. Further, a signal for authorizing the other operating unit connected in parallel to operate is included in the second control signal for performing integrated operation control.

Thus, a control signal in accordance with the manner of series or parallel connection can be transmitted to the other operating unit connected to the operating unit when performing general operation control of the operating unit group, whereby the degree of freedom in changing the manner of connection of the operating unit group and the degree of freedom expanding the operating units can be improved.

According to a further aspect, the present invention is directed to a control unit provided, in order to generally control a group of a plurality of operating units performing a certain operation as a whole connected in series or in parallel to enable. regular operation control in accordance with a prescribed control order, on each of said plurality of operating units, said control unit including:

a signal transmitting/receiving part for performing transmission/reception of respective ones of a control signal transmitted to the operating unit on a lower side of the control order for commanding an operation of the operating unit on the lower side of the control order and an authorization signal transmitted to the operating unit on a higher side of the control order for authorizing an operation of the operating unit connected in parallel with respect to the remaining connected operating units for the integrated operation control; and an operation control part for controlling such that said certain operation is executed when the signal transmitting/receiving part receives the control signal from the higher side of the control order, wherein said signal transmitting/receiving part further transmits the control signal to the operating unit on the lower side after the operation controlled by the operation control part in response to the control signal from the operating unit on the higher side terminates when the operating unit is connected in series on the lower side of the control order, and transmits said authorization signal to the operating unit on the higher side after the operation controlled by the operation control part terminates when the operating unit is not connected in series on the lower side of the control order.

When transmission/reception of the signals in such a mode is performed, it corresponds to the least significant operating unit among series-connected operating units, for example.

Thus, the control signal is successively transmitted from the higher side to the operating unit on the lower side, whereby the operating units forming the operating unit group successively operate. The authorization signal authorizing the operation of the operating unit connected in parallel is transmitted from the least significant operating unit among the operating units connected in series toward the operating unit on the higher side, whereby operating units connected in parallel can also be successively driven after operation termination of the series-connected operating units.

According to a further aspect, the present invention provides a control unit provided on each of a plurality of operating units for general control of a group of operating units performing a certain operation and connected in series or in parallel with each other to enable regular operation control in accordance with a prescribed control order, and the unit includes a signal transmitting/receiving part performing transmission/reception of respective ones of a control signal transmitted to an operating unit on a lower side of the control order for commanding an operation of the operating unit on the lower side of the control order and an authorization signal transmitted to an operating unit on a higher side of the control order for authorizing an operation of an operating unit connected in parallel with respect to connected other operating units for general operation control, and an operation control part performing such control that makes the certain operation executed when the signal transmitting/receiving part receives a control signal from the higher side of the control order, and the signal transmitting/receiving part further transmits the control signal to the operating unit on the lower side after the operation controlled by the operation control part in response to reception of the control signal from the operating unit on the higher side terminates, when the operating unit is connected in series to the higher side and the lower side of the control order, and further transmits the authorization signal to the operating unit on the higher side in response to reception of an authorization signal from the operating unit on the lower side of the control order. When transmission/reception of the signals in such a manner is performed, it corresponds to an intermediate operating unit between the most significant one and the least significant one among series-connected operating units, for example.

Thus, the control signal is successively transmitted from the higher side to the operating unit on the lower side, whereby the operating units forming the operating unit group successively operate. The authorization signal authorizing the operation of the operating unit connected in parallel is transmitted toward the operating unit on the higher side successively through operating units connected in series, whereby operating units connected in parallel can also be successively driven after the end of operation termination of the series-connected operating units.

BRIEF DESCRIPTION OF THE DRAWINGS

FIGS. 10A and 10B are diagrams showing the relation between presence/absence of signals received by signal determination parts of the multi-optical axis photoelectric switch according to Embodiment 2 and the type and co state of the multi-optical axis photoelectric switch.

FIGS. 16A and 16B are diagrams showing the relation between presence/absence of signals received by signal determination parts of the multi-optical axis photoelectric switch according to Embodiment 3 and the type and connection state of the multi-optical axis photoelectric switch.

BEST MODE FOR CARRYING OUT THE INVENTION

Embodiments of the present invention are now described with reference to drawings.

Embodiment 1

Figure 1:
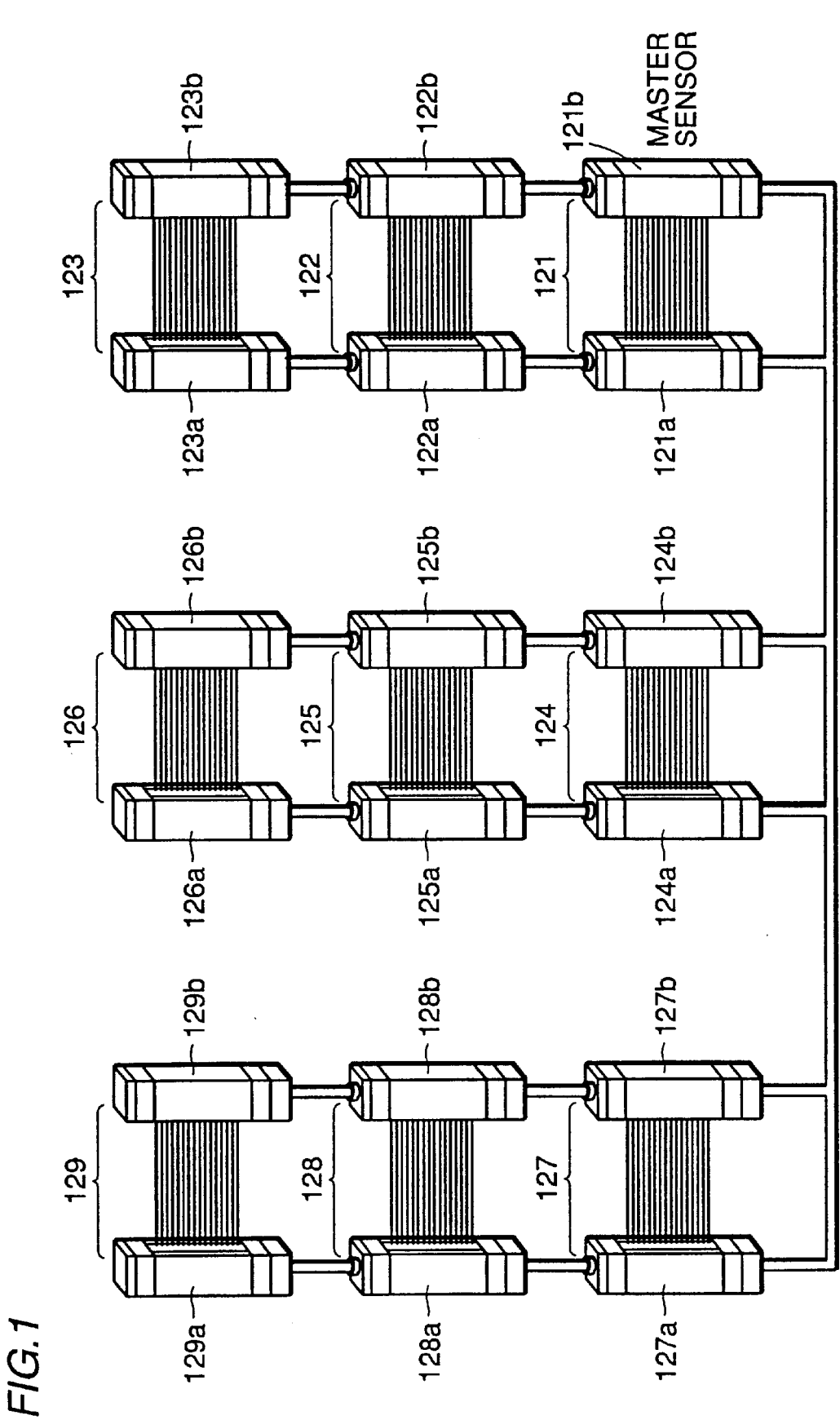
FIG. 1 is an explanatory diagram showing a connection state of multi-optical axis photoelectric switches according to Embodiment 1.
Figure 20:
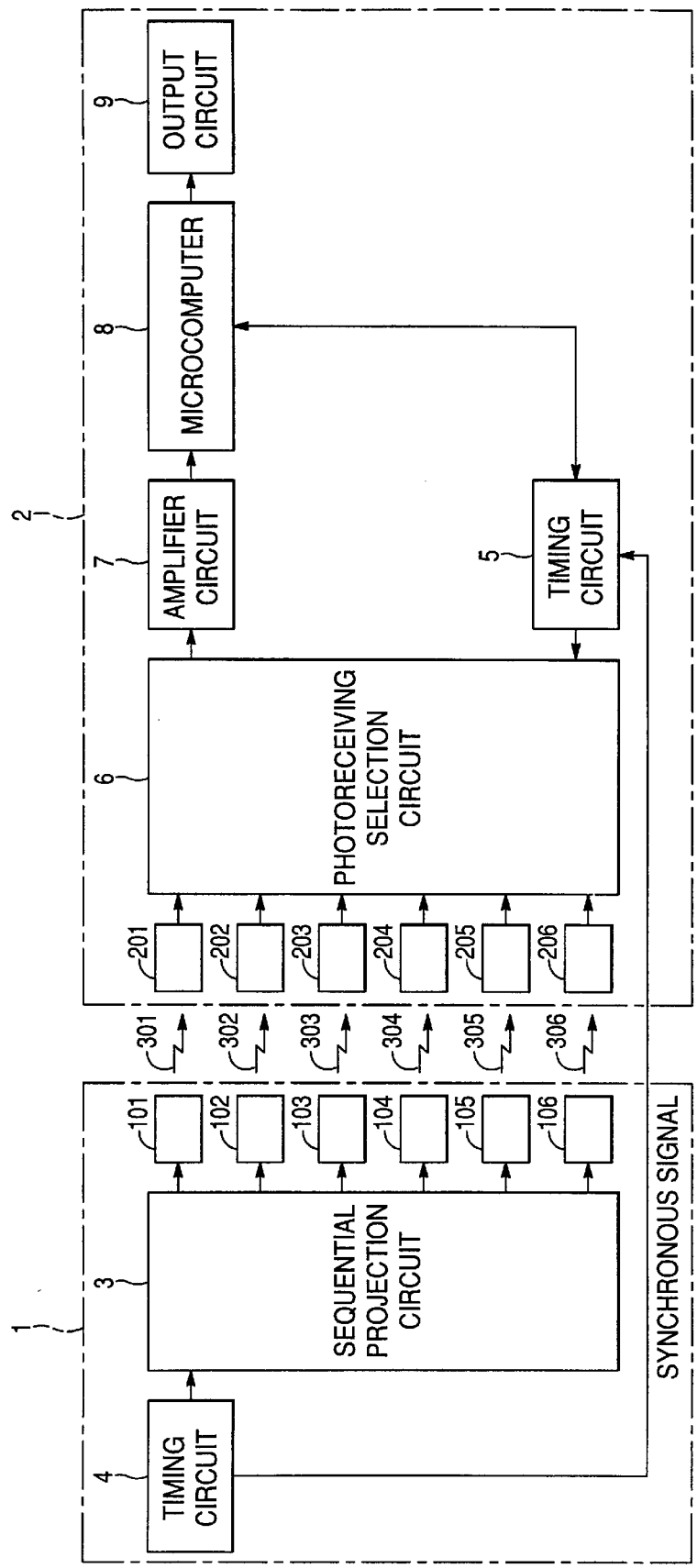
FIG 20 is a block diagram showing the structure of a multi-optical axis photoelectric switch.
Figure 21:
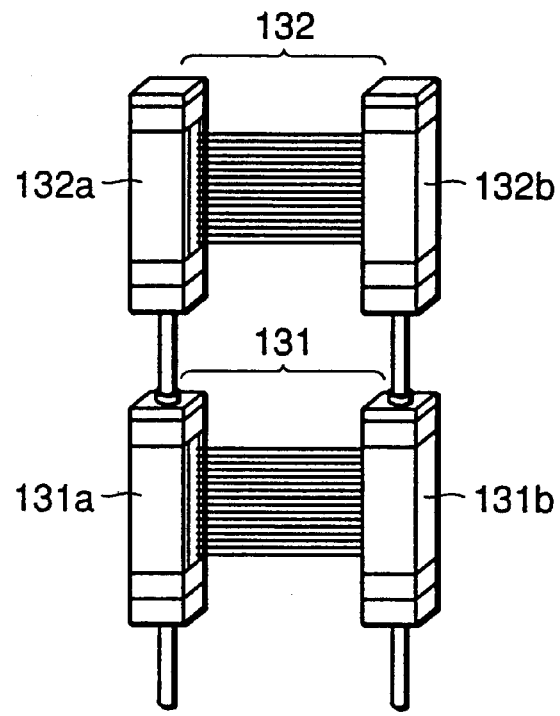
FIG. 21 is a front elevational view of series-connected conventional multi-optical a front photoelectric switches.
Figure 22:
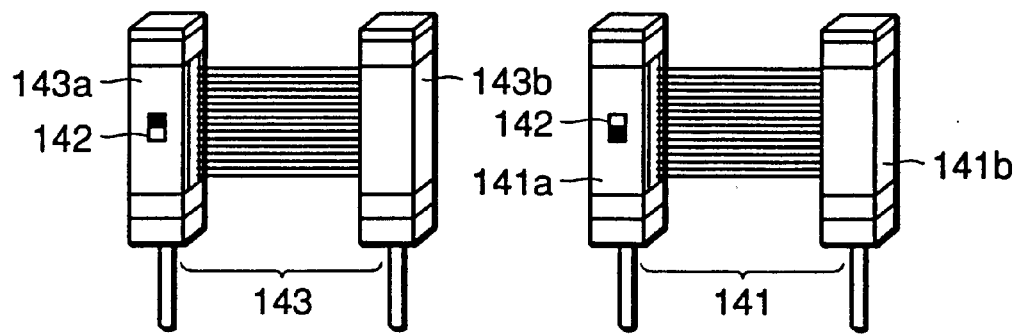
FIG. 22 a front elevational view of multi-optical axis photoelectric switches of a structure preventing mutual interference by employing dip switches.
Figure 23A:
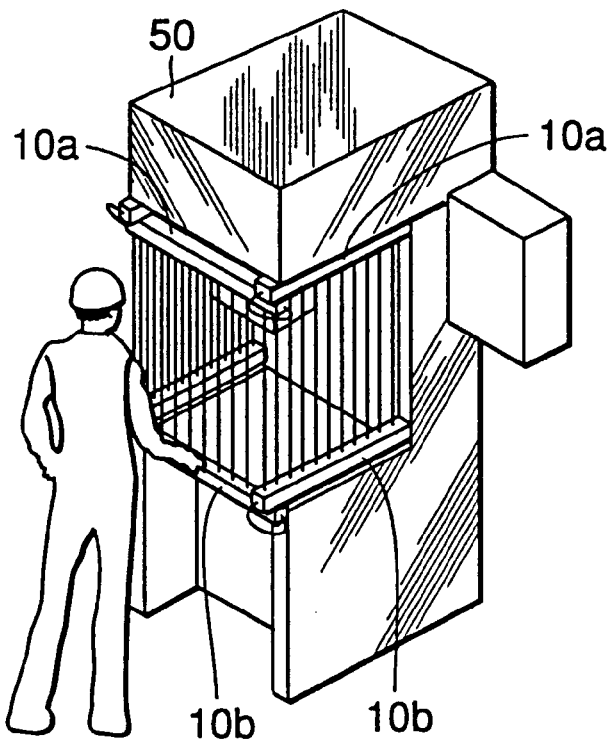
FIG. 23A and FIG. 23B are perspective views illustrating specific examples of use of multi-optical axis photoelectric switches.
Figure 23B:
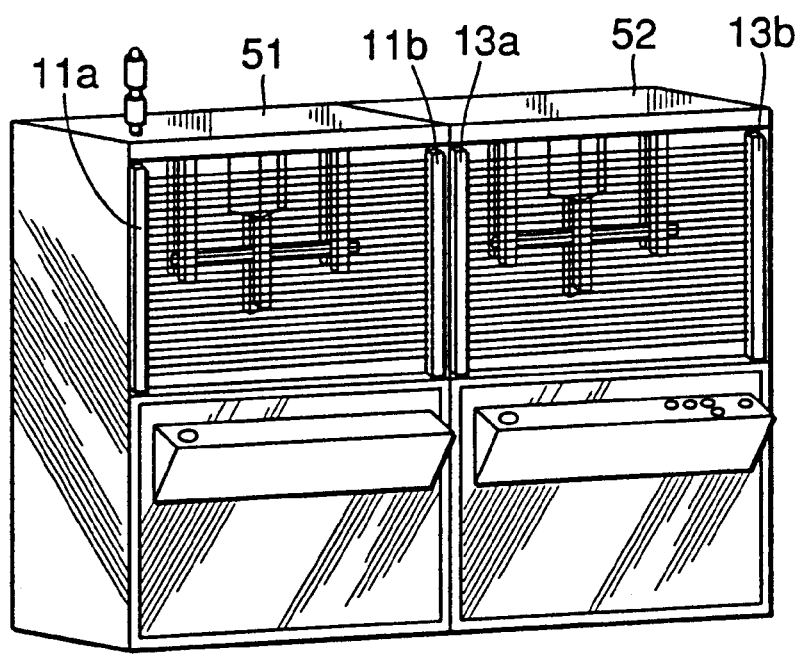

FIG. 1 is an explanatory diagram showing a connection state of multi-optical axis photoelectric switches according to Embodiment 1. A multi-optical axis photoelectric switch of one unit is hereafter called a sensor. Referring to FIG. 1, a multi-optical axis photoelectric switch group is structured by connecting sensors 121 to 129 of nine pairs in total including series three pairs and parallel three pairs. Each sensor includes a pair of projector and photoreceiver. In this multi-optical axis photoelectric switch group, therefore, nine projectors 121b to 129a and nine photoreceivers 121b to 129b are included. The structure of a detection circuit of the multi-optical axis photoelectric switch according to Embodiment 1 is basically a structure similar to that shown in FIG. 20.

The sensors in the multi-optical axis photoelectric switch group are classified into a master sensor and slave sensors. The master sensor is a sensor controlling the timing of operation start among the connected sensors, and the slave sensors are sensors operating dependently on the master. The master sensor is implemented by only one pair among the sensors of nine pairs. All sensors but the master sensor are slave sensors operating dependently on the master sensor.

In this example, the sensor 121 is the master sensor, and the remaining sensors 122 to 129 are slave sensors. In such a multi-optical axis photoelectric switch group, there are concepts of higher and lower in relation to connected positions. In series-connected sensors, a side approaching the master sensor is called higher and a side away from the master sensor is called lower. Among the plurality of sensors 121, 122 and 123 series-connected to the sensor 121 that is the master sensor, therefore, the master sensor (the sensor 121) is the most significant sensor, and the sensor 123 is the least significant sensor. Further, among the series-connected plurality of sensors in parallel relation to the master sensor (the sensor 121), the sensor parallel-connected to the master sensor (the sensor 121) is the most significant sensor among the sensors which are in the series connection relation. In other words, the sensor 124 is the most significant sensor and the sensor 126 is the least significant sensor among the sensors 124, 125 and 126. Among the sensors 127, 128 and 129, the sensor 127 is the most significant sensor, and the sensor 129 is the least significant sensor.

In such a multi-optical axis photoelectric switch group, detecting operations are performed in order of 122, 123, 124, 125, 126, 127, 128 and 129 starting from the master sensor (the sensor 121), as described later. When the sensors are connected in such a manner in the multi-optical axis photoelectric switch group, therefore, such a time sequential processing is possible, in that the connected sensors successively operate time-sequentially as the detecting operations by the multi-optical axis photoelectric switches are successively executed one by one, starting from the master sensor. Thus, mutual interference can be prevented between the connected sensors.

Figure 2:
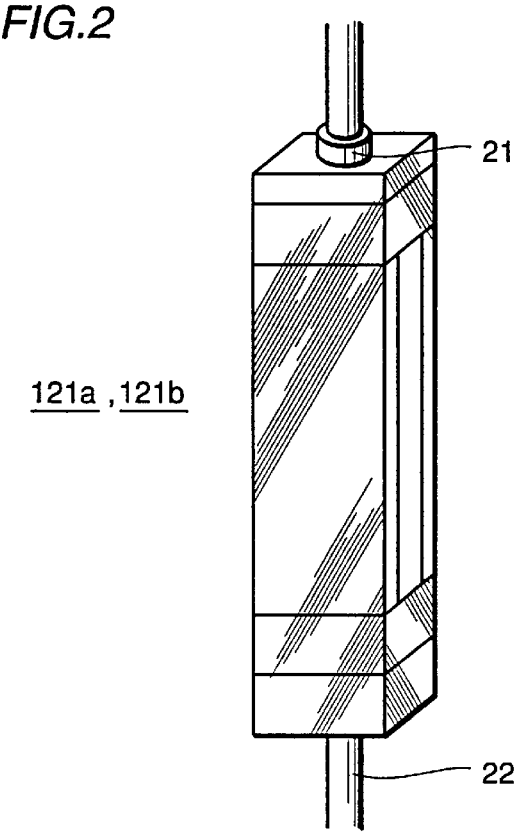
FIG. 2 is a perspective view showing the appearance of the multi-optical axis photoelectric switch according to Embodiment 1.

FIG. 2 is a perspective view showing the appearance of the multi-optical axis photoelectric switch according to Embodiment 1. The sensors 121 to 129 have similar structures. Therefore, description is made here with the sensor 121 as a typical example. Referring to FIG. 2, the projector 121a of the sensor 121 includes a signal interface part 21 employed only when series connection is to be made, and a signal interface part 22 employed for parallel connection or series connection. The signal interface parts 21 and 22 may be terminal blocks or cables, although FIG. 2 shows an example employing connectors. The photoreceiver 121b also has an appearance and a structure similar to those of the projector 121a.

Figure 3:
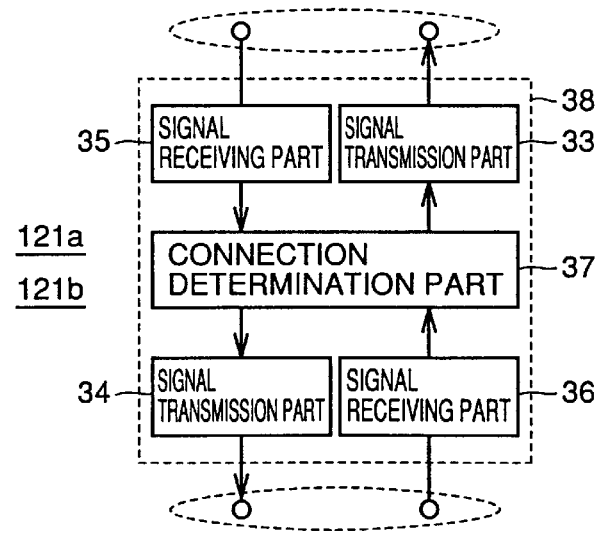
FIG. 3 is a block diagram showing functions of the multi-optical axis photoelectric according to Embodiment 1.

FIG. 3 is a block diagram showing functions of the multi-optical axis photoelectric switch according to Embodiment 1. The sensors 121 to 129 have similar structures as described above, and hence description is made here with the sensor 121 as a typical example. Referring to FIG. 3, each of the projector 121a and the photoreceiver 121b of the sensor 121 includes a control part 38. The control part 38 includes signal transmission parts 33 and 34, signal receiving parts 35 and 36 and a connection determination part 37.

The signal transmission part 33 is that for outputting a certain specific signal (a signal for connection state determination shown in FIG. 4, FIG. 8 and FIG. 15 described later) to the series-connected sensor on the lower side. The signal transmission part 34 is that for transmitting a signal to the parallel-connected sensor or the series-connected sensor on the higher side. The signal receiving part 35 is that for receiving a signal transmitted from the sensor connected on the lower side and transmitting the signal to the connection determination part 37. The signal receiving part 36 is that for receiving a signal from the series-connected sensor on the higher side or the parallel-connected sensor and transmitting the signal to the connection determination part 37. Each of the signal receiving parts 35 and 36 is that for executing various determination processing such as a determination as to whether the sensor of its own is a master or a slave and a determination of the connection state of the sensor on the basis of the reception result of the received signal.

Figure 4:
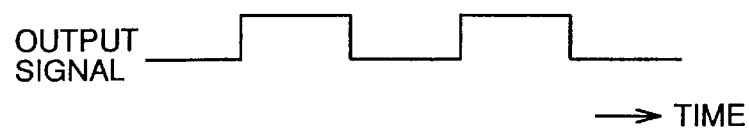
FIG. 4 is an explanatory diagram of a signal outputted by a signal output part of the multi-optical axis photoelectric switch according to Embodiment 1.

FIG. 4 is an explanatory diagram of the signal outputted from the signal transmission part of the multi-optical axis photoelectric switch according to Embodiment 1. Referring to FIG. 3, the signals which the projector 121A and the photoreceiver 121B of the sensor 121 output from the signal transmission parts 33 and 34 are outputted in the form of a pulse signal shown in FIG. 4.

Figure 5:
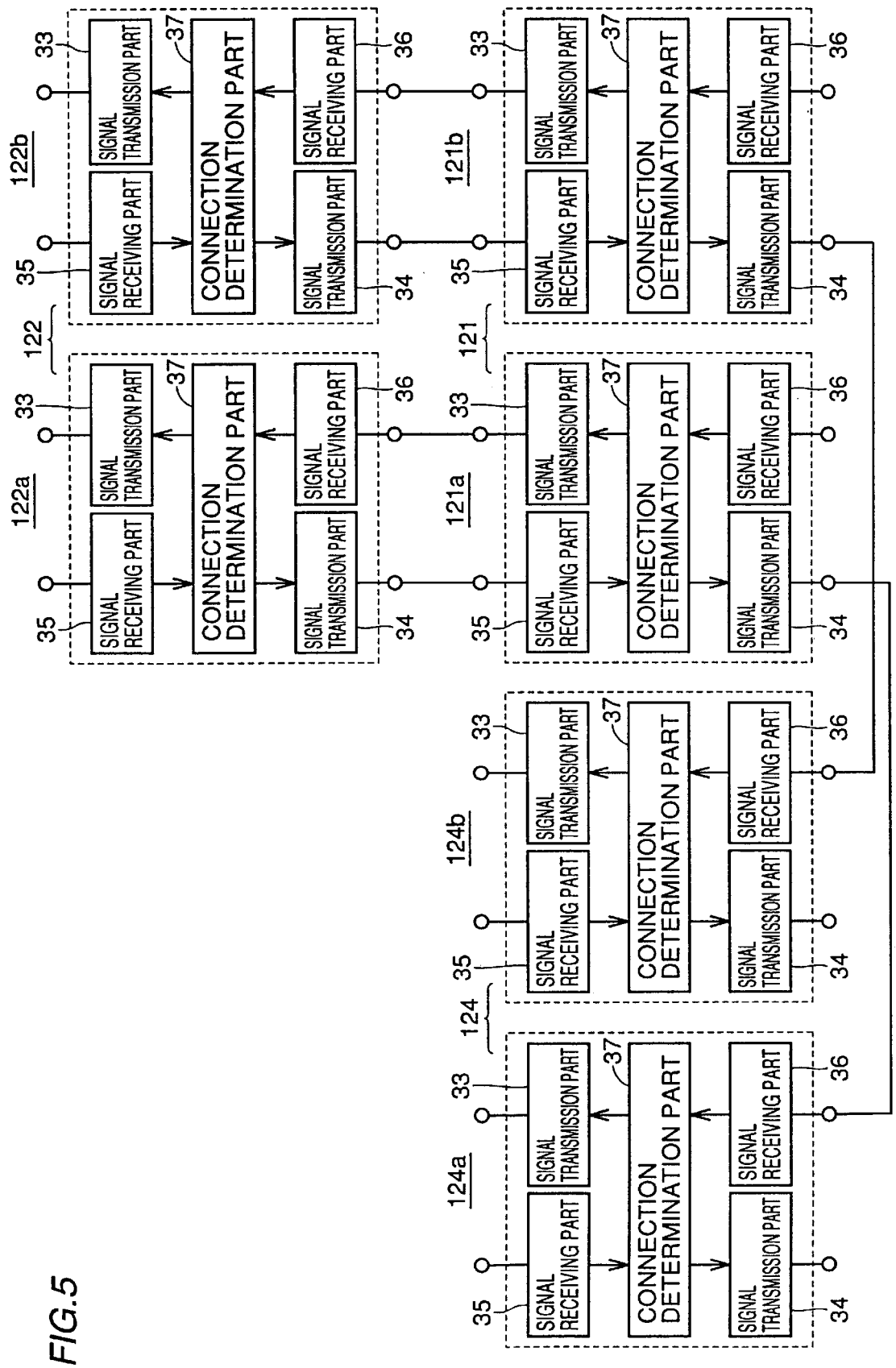
FIG. 5 is a diagram showing wires between multi-optical axis photoelectric switches according to Embodiment 1.

FIG. 5 is a diagram showing wires between the multi-optical axis photoelectric switches according to Embodiment 1. Referring to FIG. 5, the same reference numerals are applied to elements identical to the elements described with reference to FIG. 1 and FIG. 3. Detailed description on these is not repeated here. The signal transmission parts 33 and 34 and the signal receiving parts 35 and 36 of each of the projector and the photoreceiver of each sensor are series-connected and parallel-connected in the manner shown in FIG. 5. In this case, the signal transmission part 34 of the projector 121a of the sensor 121, which is the master sensor, and the signal receiving part 36 of the projector 124a of the sensor 124 are connected while the signal transmission part 34 of the photoreceiver 121b of the sensor 121 and the signal receiving part 36 of the photoreceiver 124b of the sensor 124 are connected, whereby the sensor 121 and the sensor 124 are connected in parallel.

Figure 6:
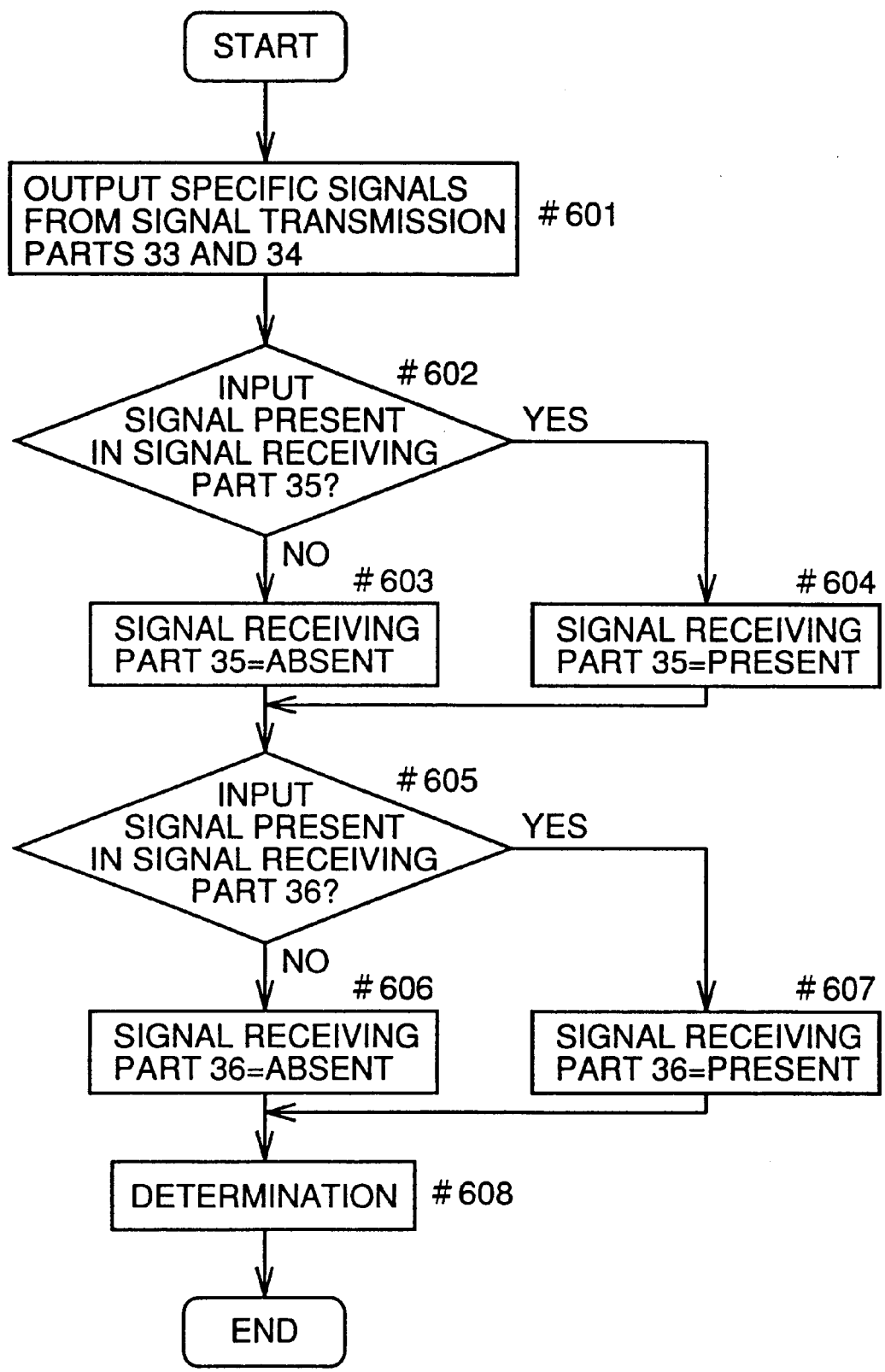
FIG. 6 is a flow chart showing the procedure of connection state determination processing of the multi-optical axis photoelectric switch according to Embodiment 1.

FIG. 6 is a flow chart showing the procedure of connection state determination processing of the multi-optical axis photoelectric switch according to Embodiment 1. This connection state determination processing is executed by the connection determination part 37 at the time of power-on of the multi-optical axis photoelectric switch. Alternatively, the connection state determination processing may be executed at an arbitrary time other than power-on, in response to a command by the user. When the connection state determination processing is performed, the projectors and the photoreceivers of all connected sensors simultaneously output the signals described above with reference to FIG. 4 from the signal transmission parts 33 and 34 respectively. Transmission of such signals may be successively performed in a prescribed order. When transmission of such signals is performed, the projectors and the photoreceivers of all connected sensors receive the signals inputted to the signal receiving parts 35 and 36, and the connection state determination part 37 determines presence/absence of the received signals.

Referring to FIG. 6, the respective ones of the signal transmission parts 33 and 34 of each of the projector and the photoreceiver of each sensor first transmit/output specific signals to the signal receiving parts 35 and 36 of the connected adjacent projector or photoreceiver (#601). Then, a determination as to whether or not the signal receiving part 35 has received an input signal, i.e., a determination of presence/absence of the input signal is made (#602). If it is determined that the input signal has been received, it is recorded that there is an input in the signal receiving part 35 (#604). If it is determined that there is no input signal, it is recorded that there is no input in the signal receiving part 35 (#603). If it is recorded that there is the input signal in the signal receiving part 35 or if it is recorded that there is no input signal in the signal receiving part 35, a determination as to whether or not the signal receiving part 36 has received an input signal, i.e., a determination on presence/absence of the input signal is made (#605). If it is determined that there is the input signal, it is recorded that there is an input in the signal receiving part 36 (#607). If it is determined that there is no input signal, it is recorded that there is no input in the signal receiving part 36 (#606). If it is recorded that there is an input in the signal receiving part 36 or if it is recorded that there is no input in the signal receiving part 36, a determination is made as to whether the sensor in which presence/absence of the input signal is recorded is a master sensor or a slave sensor on the basis of determination references described later with reference to FIG. 7 (#608). Thereafter the connection state determination processing terminates.

Figures 7, 8:
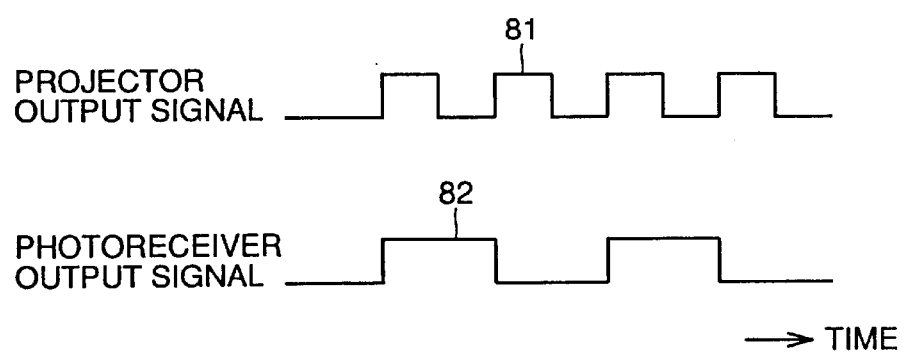
FIG. 7 is a diagram showing the relation between presence/absence of signals received by signal determination parts of the multi-optical axis photoelectric switch according to Embodiment 1 and the type and connection state of the multi-optical axis photoelectric switch.
FIG. 8 is an explanatory diagram of signals outputted from signal output parts of a multi-optical axis photoelectric switch according to Embodiment 2.

FIG. 7 is a diagram showing the relation between presence/absence of signals received in the signal receiving parts of the multi-optical axis photoelectric switch according to Embodiment 1 and the type and the connection state of the multi-optical axis photoelectric switch. Referring to FIG. 7, the connection determination part 37 makes a determination as to whether it is a master or a slave and a determination of the connection state of the sensor at #608 described above with reference to FIG. 6, in accordance with the relation shown in FIG. 7. Namely, if there is neither input in the signal receiving part 35 nor input in the signal receiving part 36, it determines that it is a master sensor and determines that it is not series-connected. If there is no input in the signal receiving part 35 but there is an input in the signal receiving part 36, it determines that it is a slave sensor and determines that it is not series-connected. If there is an input in the signal receiving part 35 but there is no input in the signal receiving part 36, it determines that it is a master sensor and determines that it is series-connected. If there are both an input in the signal receiving part 35 and an input in the signal receiving part 36, it determines that it is a slave sensor and determines that it is series-connected.

The contents of operation when the multi-optical axis photoelectric switch group according to Embodiment 1 are collectively controlled for the detecting operations are now described. Control of the detecting operations described below may be performed by a control part independent of the connection determination part 37, or the connection determination part 37 may have a detecting operation control function other than connection determination so that the connection determination part 37 having the function performs the control.

The projector 121*a* of the sensor 121, which is the master sensor, performs the following operations: In the multi-optical axis photoelectric switch group, the master sensor first performs the detecting operation. The projector 121*a* of the master sensor transmits a synchronous signal formed by a clock signal to the photoreceiver 121*b,* the projector 122*a* of the series-connected sensor 122 and the respective ones of the projector and the photoreceiver of each of the parallel-connected sensor 124 and sensor 127.

Here, the transmitted synchronous signal is a signal defining the timings of projecting operations and photoreceiving operations of all sensors in the multi-optical axis photoelectric switch group. The synchronous signal transmitted to the projector 122*a* is transmitted to the projector of the series-connected least significant sensor through all series-connected projectors. The synchronous signal transmitted to the photoreceiver 121*b* is transmitted to the photoreceiver of the series-connected least significant sensor through all series-connected photoreceivers. The synchronous signal transmitted to the projector and the photoreceiver of each parallel-connected sensor is transmitted to the projector and the photoreceiver of the least significant sensor through the projector and the photoreceiver of the lower sensor series-connected to each of these sensors.

Further, the projector 121*a* of the master sensor transmits a start signal to the photoreceiver 121*b,* and starts transmission of the synchronous signal (clock signal). Here, the start signal defines a start timing of the detecting operations in the multi-optical axis photoelectric switch group, and transmitted in a prescribed cycle. The transmission cycle is set to correspond to the time period from the start of the detecting operation of the master sensor 121, followed by successive progress of the detecting operations of the remaining sensors, to the termination of the detecting operation of the sensor of the last order. By setting the transmission cycle for the start signal at such a cycle, the detecting operations by all sensors in the multi-optical axis photoelectric switch group can be smoothly and repetitively performed.

The projector 121*a* of the master sensor makes a plurality of projective elements sequentially emit light in synchronization with the synchronous signal generated by itself and performs a series of projecting operations. After termination of the projecting operations, it transmits a projection start signal to the projector 122*a* of the series-connected lower sensor 122. This projection start signal commands the series-connected lower sensor to start the projecting operations.

Operations of the photoreceiver 121*b* of the master sensor are now described. Upon reception of the start signal from the projector 121*a* of the master sensor, the photoreceiver 121*b* first sequentially selects photodetectors in synchronization with the aforementioned synchronous signal and performs a series of photoreceiving operations. Thus, photoreceiving operations synchronous with the projecting operations are performed. After termination of the photoreceiving operations, a photoreceiving start signal is transmitted to the photoreceiver 122*b* of the series-connected lower sensor 122. This photoreceiving start signal commands the series-connected lower sensor to start the photoreceiving operations.

Operations of the projector 122*a* of the slave sensor are now described. When receiving the projection start signal from the projector 121*a* of the master sensor, it starts the projecting operations. The projecting operations are performed in synchronization with the aforementioned synchronous signal. After termination of a series of projecting operations, it transmits a projection start signal to the projector 123*a* of the series-connected lower sensor 123. Operations of the photoreceiver 122*b* of the slave sensor are now described. When receiving the photoreceiving start signal from the photoreceiver 121*b* of the master sensor, it first starts the photoreceiving operations. The photoreceiving operations are performed in synchronization with the aforementioned synchronous signal. Thus, photoreceiving operations synchronous with the projecting operations are performed. After termination of a series of photoreceiving operations, a photoreceiving start signal is transmitted to the photoreceiver 123*b* of the series-connected lower sensor 123.

The projector 123*a* of the least significant slave sensor basically performs operations similar to those of the projector 122*a* of the aforementioned slave sensor. When the projecting operations terminate, further, the projector 123*a* of the least significant slave sensor transmits an end signal indicating that the projecting operations of the least significant sensor have terminated to the projector 121*a* of the master sensor through the projector of the series-connected sensor. Similarly, when the projecting operations terminate, the photoreceiver 123*b* of the least significant slave sensor transmits an end signal indicating that the projecting operations of the least significant sensor have terminated to the projector 121*b* of the master sensor through the projector of the series-connected sensor.

Receiving the end signal, the projector 121a of the master sensor transmits a projection start signal to the projector of the parallel-connected sensor. Thus, the projector of the parallel-connected sensor performs operations similar to those of the projector of the aforementioned series-connected slave sensor. Further, the sensor series-connected to a parallel-connected sensor performs operations similar to those of the projector of the aforementioned slave sensor. Receiving the end signal, the photoreceiver 121b of the master sensor transmits a photoreceiving start signal to the photoreceiver of the parallel-connected sensor. Thus, the photoreceiver of the parallel-connected sensor performs operations similar to those of the aforementioned series-connected slave sensor.

Such detecting operations are performed successively from the master sensor to the slave sensor of the last order, whereby detection by all sensors in the multi-optical axis photoelectric switch group is performed. In this case, the multi-optical axis photoelectric switches perform the detecting operations one by one successively from the master sensor in the multi-optical axis photoelectric switch group, whereby it is possible to prevent occurrence of the aforementioned mutual interference. Therefore, different from the prior art, it is not necessary to perform adjustment of setting of the projection timing as to each sensor for preventing mutual interference, and occurrence of mutual interference resulting from erroneous setting can be prevented, whereby mutual interference can be reliably prevented.

According to Embodiment 1, as hereinabove described, communication is made by the signal transmission parts and the signal receiving parts with the projector or the photoreceiver of the adjacent multi-optical axis photoelectric switch in the control part provided on each of the projectors and the photoreceivers of the plurality of multi-optical axis photoelectric switches, in order to generally control such a multi-optical axis photoelectric switch group as a whole, which includes multi-optical axis photoelectric switches performing object detection between projectors emitting light and photoreceivers receiving the light and to make the same regularly perform operation control. The connection determination part determines whether itself is a master or a slave on the basis of the relative positional relation obtained as a result of communicating operations by the signal transmission parts and the signal receiving parts. Namely, the multi-optical axis photoelectric switch provided with the control part is decided to be a master sensor if it is determined by the connection determination part that there is no input in the signal receiving part 36. If it is determined that there is an input in the signal receiving part 36, on the other hand, the multi-optical axis photoelectric switch provided with the control part is decided to be a slave sensor operating dependently on the master sensor.

Therefore, each multi-optical axis photoelectric switch belonging to the multi-optical axis photoelectric switch group can determine by itself whether it is a master or a slave. Therefore, it is unnecessary for the user to perform setting as to whether it is a master or a slave for each multi-optical axis photoelectric switch. Thus, the convenience for the user is improved.

Further, the multi-optical axis photoelectric switch of such a structure determines by itself whether it is a master or a slave and selectively performs operations of the master sensor or operations of the slave sensor in accordance with the determination when forming a multi-optical axis photoelectric switch group subjected to general control. Thus, the multi-optical axis photoelectric switch according to Embodiment 1 can be employed for both of the master sensor and the slave sensor, whereby there is no need to employ an extension unit which has been generally employed dedicatedly to series connection. When the multi-optical axis photoelectric switch according to this embodiment is employed, therefore, a multi-optical axis photoelectric switch group formed by a master sensor and a slave sensor can be structured by fabricating only a single type of sensors. Namely, the versatility of the multi-optical axis photoelectric switch is improved. Further, it is possible to reduce inventory when fabricating the sensors. Therefore, the fabrication cost for the sensors including the cost for the inventory of the sensors can be reduced as compared with the conventional practice.

Further, the multi-optical axis photoelectric switch can be properly used both as the master sensor and as the slave sensor in accordance with the manner of connection, whereby the following effect is further attained: when changing the manner of connection as in a case of splitting an already connected multi-optical axis photoelectric switch group for forming a plurality of independent multi-optical axis photoelectric switch groups, or when newly expanding multi-optical axis photoelectric switches in the multi-optical axis photoelectric switch group, the multi-optical axis photoelectric switch can readily and selectively execute the function as the master sensor and the function as the slave sensor, whereby the degree of freedom in changing the manner of connection of the multi-optical axis photoelectric switch group and the degree of freedom in expanding the multi-optical axis photoelectric switches can be improved. Thus, the convenience for the user is improved.

Embodiment 2

Embodiment 2 is now described with reference to drawings. The connection state of a multi-optical axis photoelectric switch according to Embodiment 2 is in common with the connection state of the multi-optical axis photoelectric switch described above with reference to FIG. 1. The appearance of the multi-optical axis photoelectric switch according to Embodiment 2 is in common with the appearance of the multi-optical axis photoelectric switch according to Embodiment 1 described above with reference to FIG. 2. A block diagram showing functions of the multi-optical axis photoelectric switch according to Embodiment 2 is in common with the block diagram showing the functions of the multi-optical axis photoelectric switch according to Embodiment 1 described above with reference to FIG. 3. Wires between multi-optical axis photoelectric switches according to Embodiment 2 are in common with the diagram showing the wires between the multi-optical axis photoelectric switches according to Embodiment 1 described above with reference to FIG. 5. Detecting operations of a multi-optical axis photoelectric switch group formed by the multi-optical axis photoelectric switches according to Embodiment 2 are in common with the detecting operations of the multi-optical axis photoelectric switch group according to Embodiment 1. Detailed description as to these is not repeated here.

FIG. 8 is an explanatory diagram of signals outputted by signal transmitting parts of the multi-optical axis photoelectric switch according to Embodiment 2. FIG. 8 corresponds to FIG. 4 of Embodiment 1. Referring to FIG. 8, an output signal 81 is a signal for a projector, which the projector outputs from signal transmitting parts 33 and 34. An output signal 82 is a signal for a photoreceiver, which the photoreceiver outputs from the signal transmitting parts 33 and 34, and the cycle of pulses is longer than that of the signal for the projector. By thus varying the output signals with the projector and the photoreceiver, not only a detection of mere presence/absence of an object but also whether or not a sensor is erroneously connected, i.e., presence/absence of erroneous connection can be determined.

Figure 9:
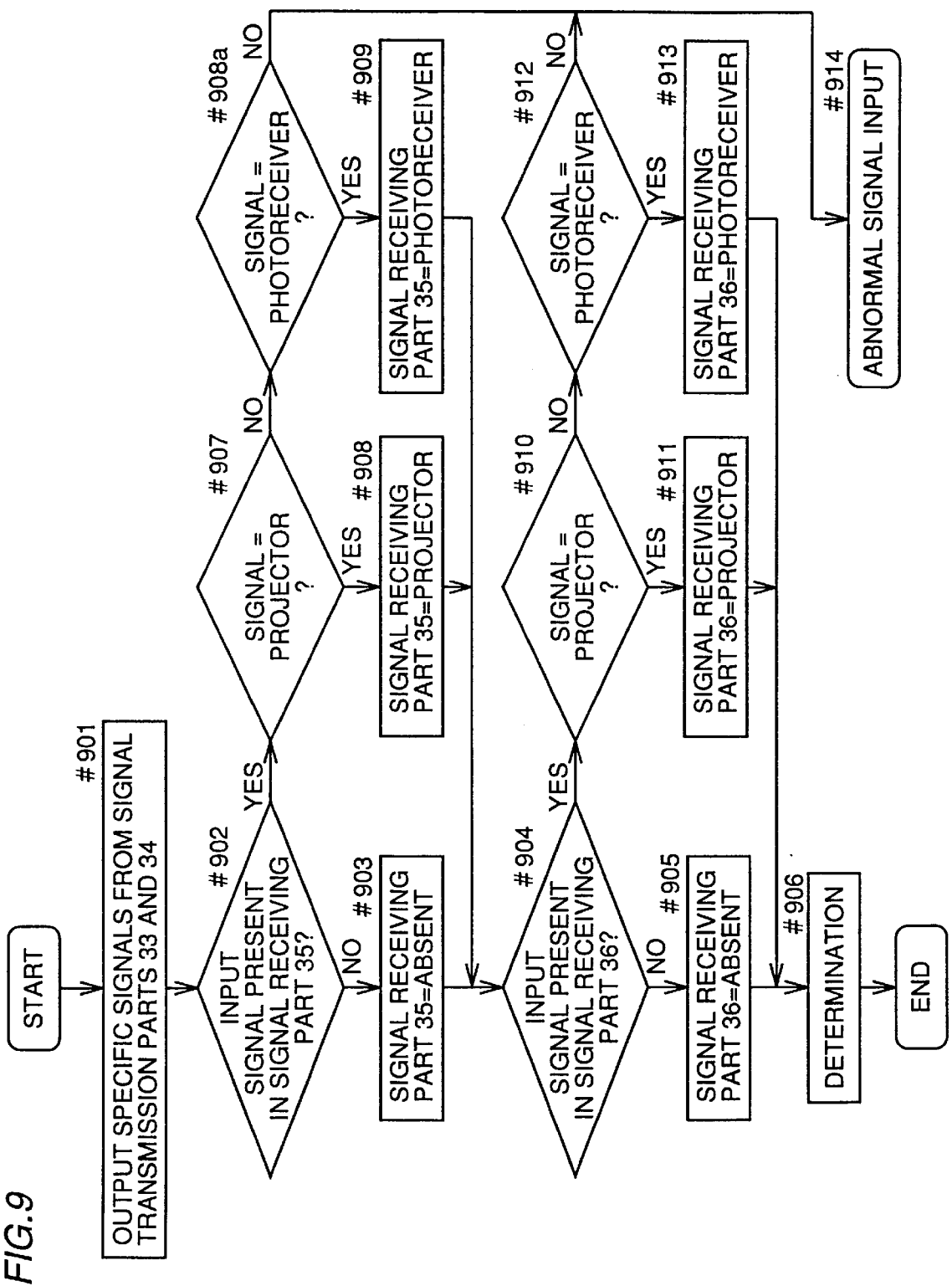
FIG. 9 is a flow chart showing the procedure of connection state determination processing of the multi-optical axis photoelectric switch according to Embodiment 2.

FIG. 9 is a flow chart showing the procedure of connection state determination processing of the multi-optical axis photoelectric switch according to Embodiment 2. Referring to FIG. 9, there is shown the procedure where the multi-optical axis photoelectric switch group is in the wiring state of the multi-optical axis photoelectric switches described above with reference to FIG. 5. A connection detection part 37 not only detects presence/absence of signals inputted in the signal receiving parts 35 and 36, but also determines whether the signals are generated from the projector or generated from the photoreceiver.

Referring to FIG. 9, specific signals (the signals shown in FIG. 8) are first transmitted from the signal transmitting parts 33 and 34 of a projector 12a and a photoreceiver 12b to the connected adjacent projector or photoreceiver (#901). Then, a determination is made as to whether or not an input signal has been received by the signal receiving part 35 of the connected adjacent projector or photoreceiver (#902). If it is determined that there is no input signal, it is recorded that there is no input in the signal receiving part 35 (#903). If it is determined that there is an input signal, a determination is made as to whether or not the input signal is a signal for the projector (#907). If determined to be the signal for the projector, it is recorded that the input in the signal receiving part 35 is the signal for the projector (#908). If the input signal is determined to be not the signal for the projector, a determination is made as to whether or not the input signal is the signal for the photoreceiver (#908a). If the input signal is determined to be the signal for the photoreceiver, it is recorded that the input in the signal receiving part 35 is the signal for the photoreceiver (#909). If it is recorded that there is no input in the signal receiving part 35 (#903), if it is recorded that the input in the signal receiving part 35 is the signal for the projector (#908) or if it is recorded that the input in the signal receiving part 35 is the signal for the photoreceiver (#909), a determination is made as to whether or not an input signal has been received by the signal receiving part 36 (#904). If it is determined that there is no input signal, it is recorded that there is no input in the signal receiving part 36 (#905). If it is determined that there is an input signal, a determination is made as to whether or not the input signal is the signal for the projector (#910). If the input signal is determined to be the signal for the projector, it is recorded that the input in the signal receiving part 36 is the signal for the projector (#911). If the input signal is determined not to be the signal for the projector, a determination is made as to whether or not the input signal is the signal for the photoreceiver (#912). If the input signal is determined to be the signal for the photoreceiver, it is recorded that the input in the signal receiving part 36 is the signal for the photoreceiver (#913).

If the input signal in the signal receiving part 35 is determined not to be the signal for the photoreceiver (#908a) and if the input signal in the signal receiving part 36 is determined not to be the signal for the photoreceiver (#912), it is determined that an abnormal signal has been inputted (#914).

If it is recorded that there is no input in the signal receiving part 36 (#905), if it is recorded that the input in the signal receiving part 36 is the signal for the projector (#911), and if it is recorded that the input signal in the signal receiving part 36 is the signal for the photoreceiver (#913), determinations as to presence/absence of erroneous connection and whether it is a master or a slave, and a determination as to presence/absence of series connection are made on the basis of determination references described later with reference to FIGS. 10A and 10B (#906). Thereafter the connection state determination processing terminates.

FIGS. 10A and 10B are diagrams showing the relation between the signals received by the signal determination parts of the multi-optical axis photoelectric switch according to Embodiment 2 and the type and connection state of the multi-optical axis photoelectric switch. The connection determination part 37 determines whether it is a master or a slave, the connection state of the sensor, and presence/absence of erroneous connection respectively in the determination processing (#906) described above with reference to FIG. 9 in accordance with these tables. Referring to FIGS. 10A and 10B, there are three types of signals, that is, "projector signal", "photoreceiver signal" and "absent" as the types of the input signals in the signal receiving parts 35 and 36 respectively. Therefore, there are nine different combinations as to the types of the input signals in the signal receiving parts 35 and 36. The respective contents of the determination as to whether it is a master or a slave and the determination on presence/absence of series connection as to each of these combinations are shown by examples 101A to 109A for the projector and by examples 101B to 109B for the photoreceiver.

According to Embodiment 2, as hereinabove described, the connection determination part 37 further makes the determination of the type of the signal received by the signal receiving part 35 and the determination of the type of the signal received by the signal receiving part 36, and the determination is made as to whether or not erroneous connection is present in the connection mode with the multi-optical axis photoelectric switch to be connected on the basis of the determination results of the signals received by the respective ones of the signal receiving parts 35 and 36.

Therefore, each multi-optical axis photoelectric switch can attain the following effect in addition to the effect attained by Embodiment 1. Namely, it can determine by itself whether or not the connection state with the multi-optical photoelectric switch to be connected, is connected in series or in parallel. Thus, the user can readily recognize presence/absence of erroneous connection, and the convenience for the user is improved.

Embodiment 3

Embodiment 3 is now described with reference to drawings. Similarly to Embodiment 2, the connection state of a multi-optical axis photoelectric switch according to Embodiment 3 is in common with the connection state of the multi-optical axis photoelectric switch according to Embodiment 1 described above with reference to FIG. 1. The appearance of the multi-optical axis photoelectric switch according to Embodiment 3 is in common with the appearance of the multi-optical axis photoelectric switch described above with reference to FIG. 2. A block diagram showing functions of the multi-optical axis photoelectric switch according to Embodiment 3 is in common with the block diagram showing the functions of the multi-optical axis photoelectric switch described above with reference to FIG. 3. Detailed description as to these is not repeated here.

Figure 11:
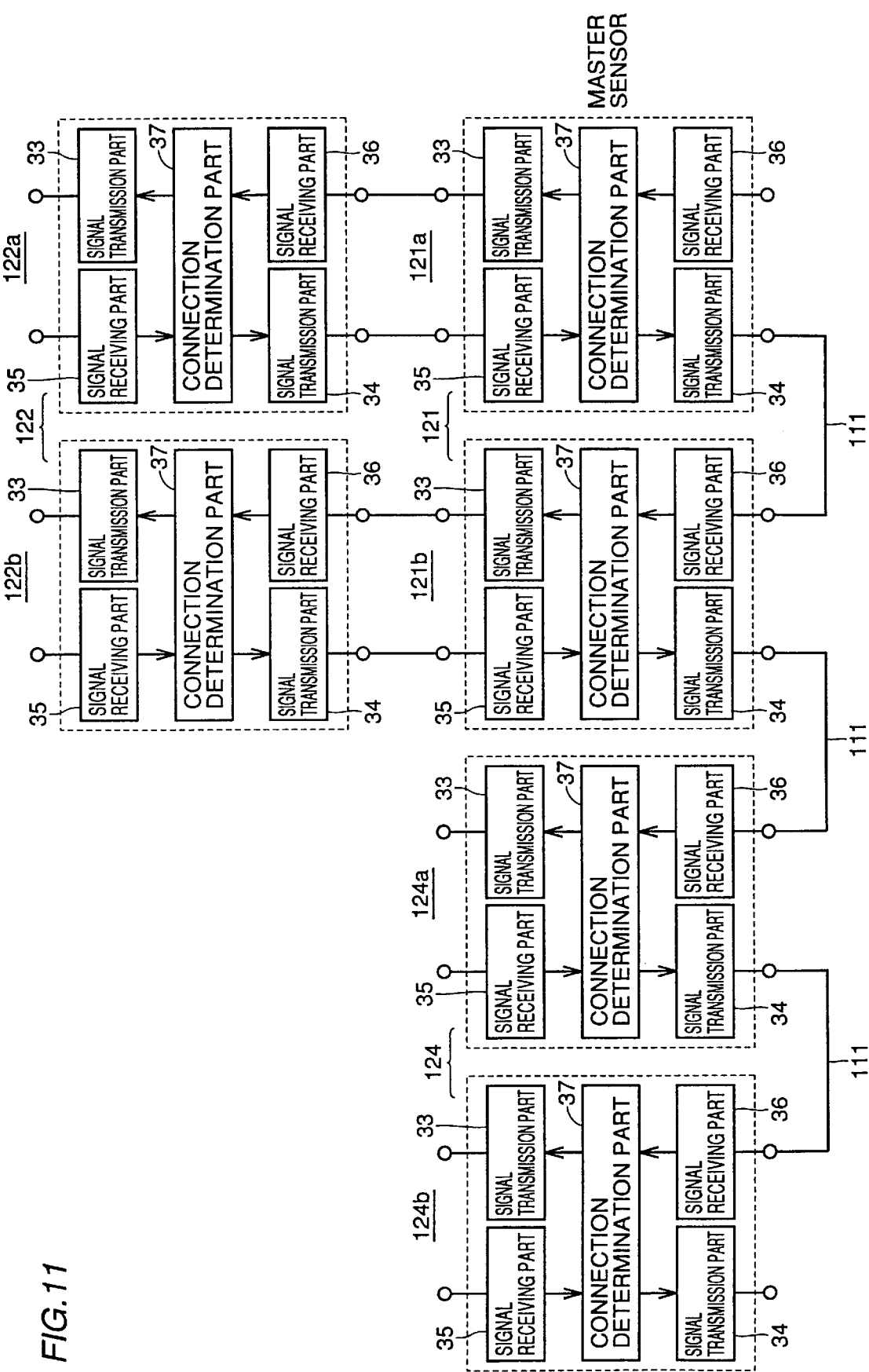
FIG. 11 is a diagram showing wires between multi-optical axis photoelectric switches according to Embodiment 3.

FIG. 11 is a diagram showing wires between multi-optical axis photoelectric switches according to Embodiment 3. The same reference numerals are applied to elements identical to the elements described above with reference to FIG. 5. Detailed description as to these is not repeated here.

Referring to FIG. 11, a point different from FIG. 5 is that, when sensors are parallel-connected, photoreceivers and projectors are connected by synchronous lines 111 between the sensors in FIG. 11, while the projectors and projectors are connected and the photoreceivers and photoreceivers are connected when the sensors are parallel-connected in FIG. 5. These synchronous lines 111 are wires through which a signal for connection state determination and a synchronous signal are transmitted. In the case of such connection, a determination can be made as to whether the projector is a master sensor or a slave sensor, while no determination can be made as to whether the photoreceiver is a master sensor or a slave sensor. However, there is such an advantage that synchronization of projection/photoreceiving processing between the projectors and the photoreceivers can be made, since the synchronous lines 111, which are wires capable of transmitting the synchronous signal between the projectors and the photoreceivers, are connected between parallel-connected sensors.

Figure 12:
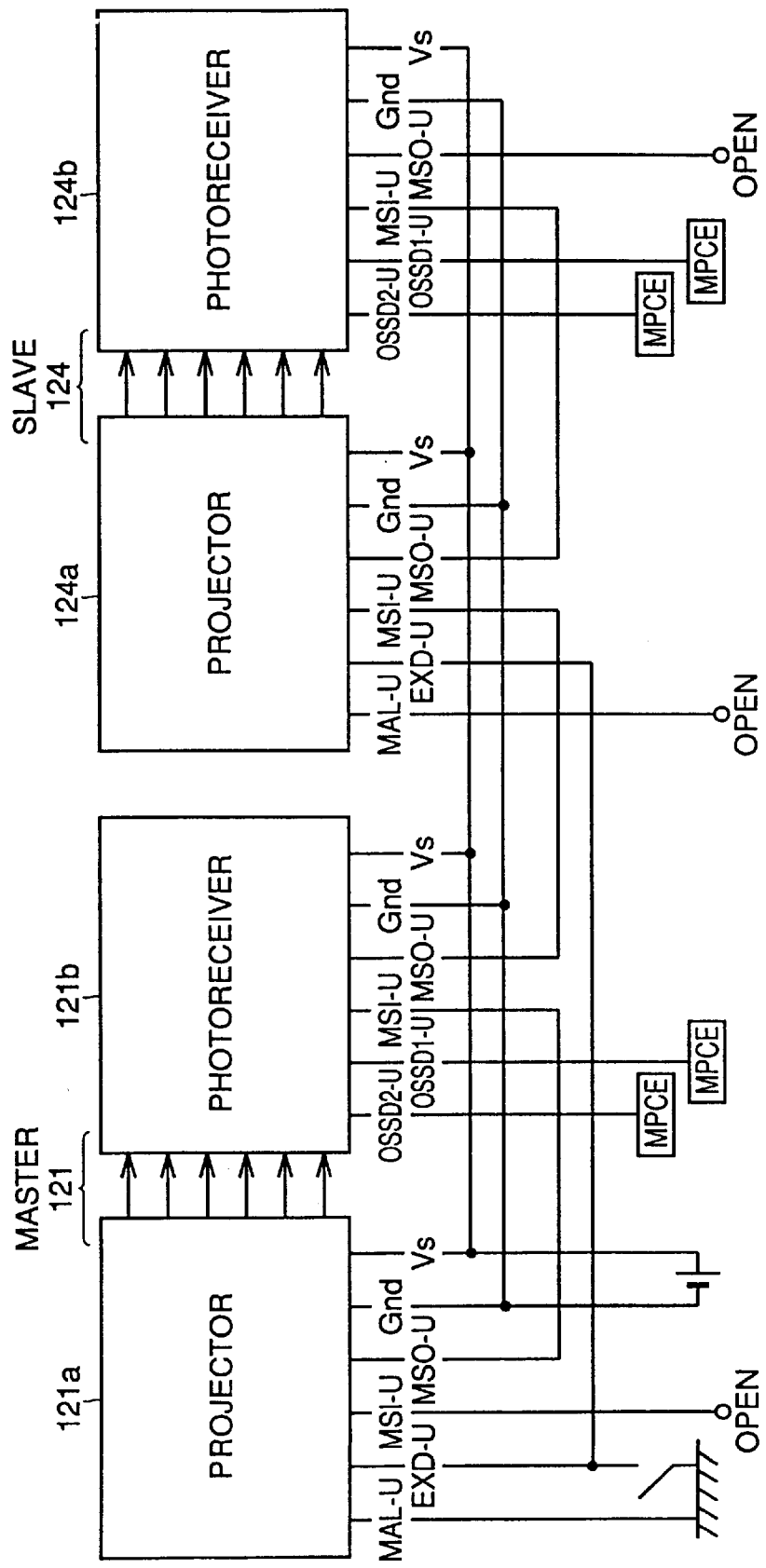
FIG. 12 is a block diagram showing a connection mode of parallel connection of the multi-optical axis photoelectric switches in detail.

The manner of parallel connection of the multi-optical axis photoelectric switches shown in FIG. 11 is now described in detail. FIG. 12 is a block diagram showing the manner of the parallel connection of the multi-optical axis photoelectric switches in detail. For example, a sensor 121 which is a master sensor and a sensor 124 which is a slave sensor parallel-connected to the sensor 121 are connected in the following manner:

The projector of each of the sensor 121 and the sensor 124 includes a terminal Vs, a terminal Gnd, a terminal MS0-U, a terminal MSI-U, a terminal EXD-U and a terminal MAL-U as terminals for connection to a higher side.

The terminal Vs and the terminal Gnd are terminals for power supply. The terminal MSO-U is a terminal for transmitting the synchronous signal and an STM signal for the projector. Here, the STM signal for the projector is a pulse signal transmitted to the photoreceiver or the projector on the higher side, and determination of the connection state of the sensor is made possible by transmission of this STM signal. Further, this STM signal is employed also for definition of a projection start timing. The terminal MSI-U is a terminal for receiving the synchronous signal and an RFM signal. Here, the RFM signal is a signal received from the photoreceiver or the higher projector, and determination the connection state of the sensor is made possible when this RFM signal is received. Further, this RFM signal is employed also for definition of the projection start timing.

The terminal EXD-U is for receiving an external diagnostic signal for state diagnostics of the sensor. The terminal MAL-U is for receiving a master signal. Here, the master signal is a signal indicating the distinction as to whether the sensor is a master sensor or a slave sensor. It is indicated that the receiving sensor is a master sensor if this master signal is at a low level, while it is indicated that the receiving sensor is a slave sensor when this master signal is at a high level.

The photoreceiver of each of the sensor 121 and the sensor 124 includes a terminal Vs, a terminal Gnd, a terminal MSO-U, a terminal MSI-U, a terminal OSSD1-U and a terminal OSSD2-U as terminals for connection to the higher side.

The terminal Vs and the terminal Gnd are similar to those described above. The terminal MSO-U is for transmitting the synchronous signal and an STM signal for the photoreceiver. Here, the STM signal for the photoreceiver is a pulse signal transmitted to the projector or the photoreceiver on the higher side, which is a pulse signal having a shorter cycle than the STM signal for the projector. The determination of the connection state of the sensor is made possible by transmission of this STM signal. Further, this STM signal is employed also for definition of a photoreceiving start timing. The terminal MSI-U is for receiving the synchronous signal and an RFM signal for the photoreceiver. Here, the RFM signal for the photoreceiver is a signal received from the projector or the higher photoreceiver, and the determination of the connection state of the sensor is made possible when this RFM signal is received. Further, this RFM signal is employed also for definition of the photoreceiving start timing. The terminal OSSD1-U and the terminal OSSD2-U are terminals for transmitting OSSD signals going high when the photoreceiving quantities of all optical axes exceed a threshold.

In the parallel-connected master sensor 121 and slave sensor 124, all terminals Vs and terminals Gnd are connected to power sources. The terminal MSO-U of the projector 121a of the master sensor 121 and MSI-U of the photoreceiver 121b of the master sensor 121 are connected. The terminal MSI-U of the projector 121a of the master sensor 121 is set in an open state. The terminal EXD-U of each of the projector 121a of the master sensor 121 and the slave sensor 124 is set in an open state in external diagnostics and set in a grounded state in a normal operation. The terminal MAL-U of the projector 121a of the master sensor 121 is grounded. Thus, the master signal received by the projector 121a of the master sensor 121 is set low, and it is indicated that the sensor 121 is a master sensor.

The terminal MSO-U of the photoreceiver 121b of the master sensor 121 and the terminal MSI-U of the projector 124a of the slave sensor 124 are connected. Each of the terminal OSSD1-U and the terminal OSSD2-U of the photoreceiver of each of the master sensor 121 and the slave sensor 124 is connected to an input terminal of a microcomputer shown in FIG. 20. The terminal MSO-U of the projector 124a of the slave sensor 124 and the terminal MSI-U of the photoreceiver 124b of the slave sensor 124 are connected. The terminal MAL-U of the projector 124a of the slave sensor 124 is set in an open state. Thus, the master signal received by the projector 124a of the slave sensor 124 is set high, and it is indicated that the sensor 124 is a slave sensor.

The terminal MSO-U of the photoreceiver 124b of the slave sensor 124 is set in an open state.

Figure 13:
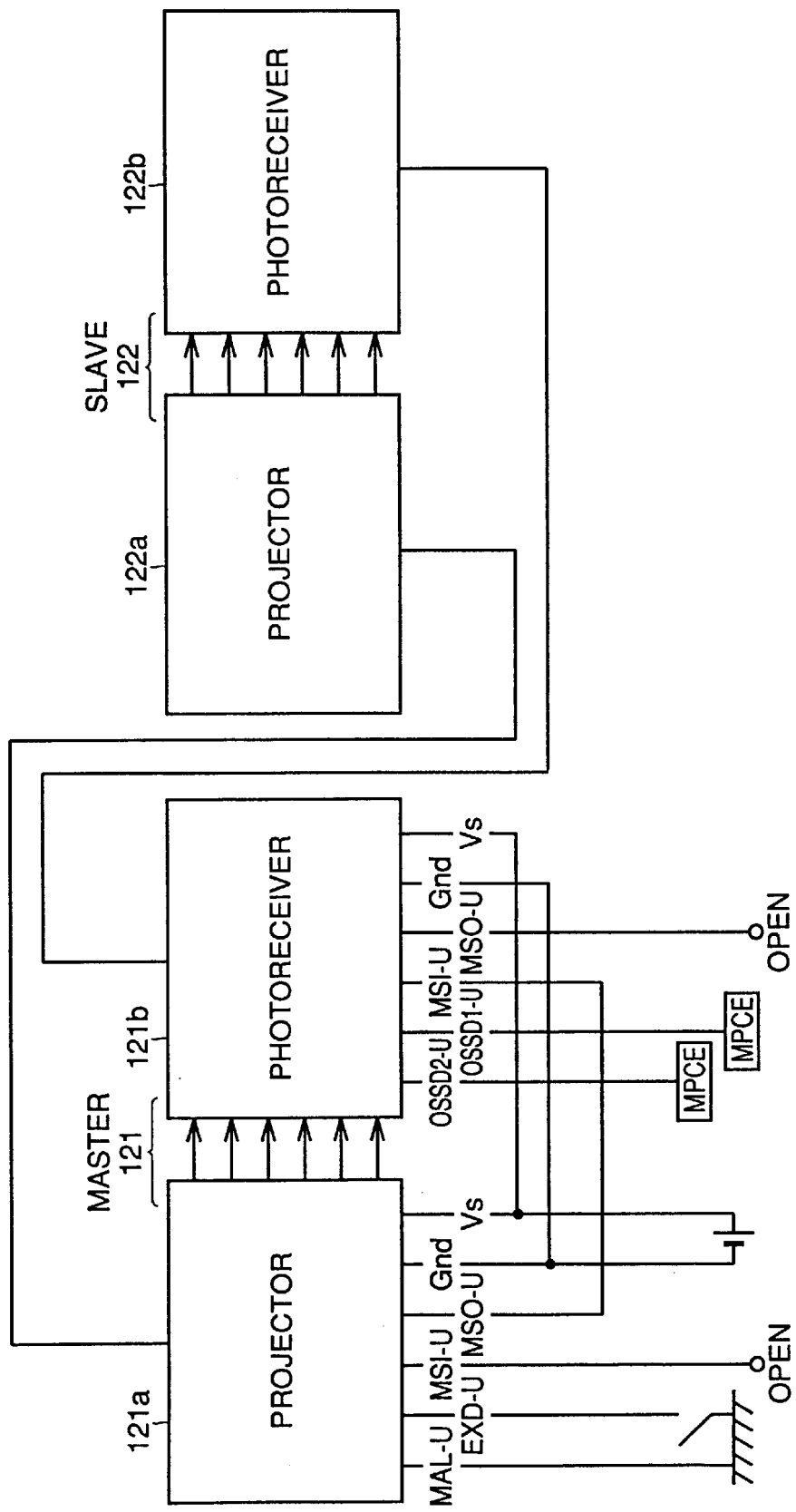
FIG. 13 is a block diagram showing a connection mode of series connection of the multi-optical axis photoelectric switches in detail.

The manner of series connection of the multi-optical axis photoelectric switches shown in FIG. 11 is now described in detail. FIG. 13 is a block diagram showing the manner of series connection of the multi-optical axis photoelectric switches in detail For example, the sensor 121 which is a master sensor and a sensor 122 which is a slave sensor series-connected to the sensor 121 are connected in the following manner:

The projector of each of the sensor 121 and the sensor 122 includes a terminal Vs, a terminal Gnd, a terminal MSO-L, a terminal MSI-L, a terminal EXD-L and a terminal MAL-L (not shown) on the opposite side to that provided with the aforementioned terminals for connection to the higher side, as terminals for connection to a lower side. The terminal MSO-L is a terminal for transmitting the synchronous signal and an STS signal for the projector. Here, the STS signal for the projector is a pulse signal transmitted to the projector on the lower side, and a pulse signal having the same cycle as the STM signal for the projector. The determination of the connection state of the sensor is made possible by transmission of this STS signal. Further, this STS signal is employed also for definition of the projection start timing. The terminal MSI-L is for receiving an RFS signal for the projector. Here, the RFS signal for the projector is a signal received from the projector on the lower side, and the determination of the connection state of the sensor is made possible when this RFS signal is received. Further, this RFS signal is employed also for definition of the projector start timing. The terminal EXD-L is a terminal for transmitting the aforementioned external diagnostic signal. The terminal MAL-L is a terminal for transmitting the aforementioned master signal.

The photoreceiver of each of the sensor 121 and the sensor 122 includes a terminal Vs, a terminal Gnd, a terminal MSI-L, a terminal MSO-L, a terminal OSSD1-L and a terminal OSSD2-L (not shown) as terminals for connection to the lower side.

The terminal MSO-L is a terminal for transmitting the synchronous signal and an STS signal for the photoreceiver. Here, the STS signal for the photoreceiver is a pulse signal transmitted to the photoreceiver on the lower side, and a pulse signal having the same cycle as the STM signal for the photoreceiver. The determination of the connection state of the sensor is made possible by transmission of this STS signal. Further, this STS signal is employed also for definition of the photoreceiving start timing. The terminal MSI-L is for receiving an RFS signal for the photoreceiver. Here, the RFS signal for the photoreceiver is a signal received from the lower photoreceiver, and the determination of the connection state of the sensor is made possible when this RFS signal is received. Further, this RFS signal is employed also for definition of the photoreceiving start timing. The terminal OSSD1-L and the terminal OSSD2-L are terminals for receiving the OSSD signals going high when the photoreceiving quantities of all optical axes exceed the threshold.

The projector 121*a* of the sensor 121 and the projector 122*a* of the sensor 122 are connected in such a manner that those in association with each other are connected among the terminal Vs, the terminal Gnd, the terminal MSO-L, the terminal MSI-L, the terminal EXD-L and the terminal MAL-L on the lower side of the projector 121*a* and the terminal Vs, the terminal Gnd, the terminal MSI-U, the terminal MSO-U, the terminal EXD-U and the terminal MAL-U on the higher side of the sensor 122. Further, the photoreceiver 121*b* of the sensor 121 and the photoreceiver 122*b* of the sensor 122 are connected in such a manner that those in association with each other are connected among the terminal Vs, the terminal Gnd, the terminal MSO-L, the terminal MSI-L, the terminal EXD-L and the terminal MAL-L on the lower side of the photoreceiver 121*b* and the terminal Vs, the terminal Gnd, the terminal MSI-U, the terminal MSO-U, the terminal OSSD1-U and the terminal OSSD2-U on the higher side of the sensor 122.

The manner of connection of the higher terminals of the projector 121*a* and the photoreceiver 121*b* of the sensor 121 in this example is different as compared with the aforementioned example of parallel connection in that the terminal MSO-U on the higher side of the photoreceiver 121*b* is set in an open state.

Figure 14:
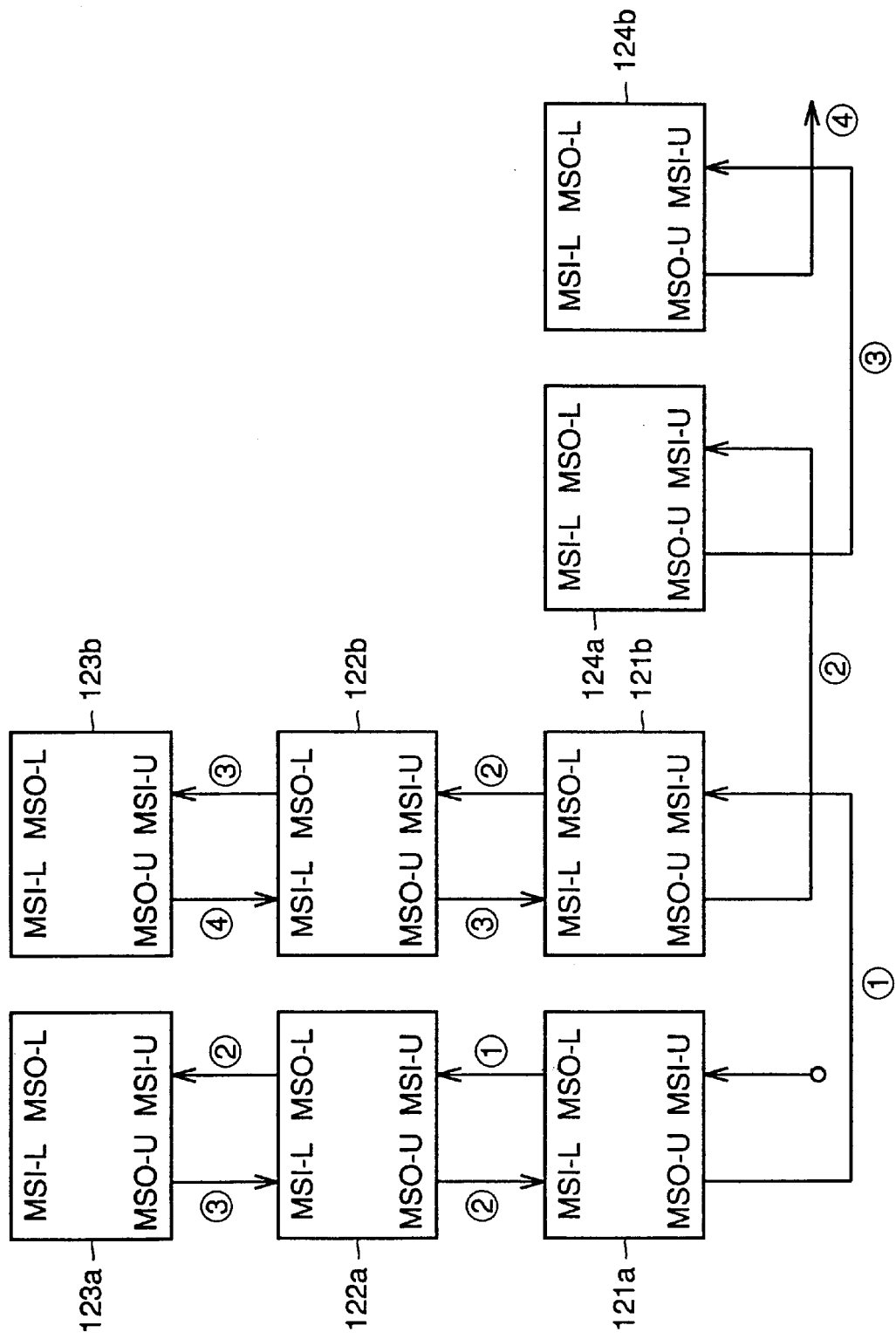
FIG. 14 a block diagram illustrating operations in a connection state determination processing operation of a multi-optical axis photoelectric switch group according to Embodiment 3.

Operations in a connection state determination processing of a multi-optical axis photoelectric switch group according to this third embodiment are now described. FIG. 14 is a block diagram illustrating the operations in the connection state determination processing of the multi-optical axis photoelectric switch group according to the third embodiment.

Referring to FIG. 14, the manner of connection is shown with such an example that the slave sensors 122 and 123 are series-connected to the master sensor 121 while the slave sensor 124 is connected in parallel as a typical example, in order to simplify the description. Referring to FIG. 14, there is shown the manner of connection as to the terminal MSI-U, the terminal MSO-U, the terminal MSO-L and the terminal MSI-L in each sensor, in order to clarify a transmission/receiving mode of signals between the sensors in the connection state determination processing operation. The manner of connection of the terminals between the series-connected sensors and the manner of connection of the terminals between the series-connected sensors have been described above and hence no description of the manner of connection of the terminals between the sensors is repeated here.

Referring to FIG. 14, numbers of ⓪ to ④ are applied to lines indicating the signals transmitted/received between the sensors. These numbers are applied along the order of the transmission timings for the signals. Signals denoted by the same number are transmitted at the same time. The signal transmitted from the terminal MSO-U of each projector is the STM signal for the projector. The signal transmitted from the terminal MSO-L of each projector is the STS signal. The signal transmitted from the terminal MSO-U of each photoreceiver is the STM signal for the photoreceiver. The signal transmitted from the terminal MSO-L of each photoreceiver is the STS signal for the photoreceiver.

The signal received by each terminal MSI-U of each projector and each photoreceiver is the RFM signal. Specifically, when the STS signal transmitted from the higher side is received in each terminal MSI-U, this signal is the RFM signal. The signal received by each terminal MSI-L of each projector and each photoreceiver is the RFS signal. Specifically, when the STS signal transmitted from the lower side is received in each terminal MSI-L, this signal is the RFS signal.

Figure 15:
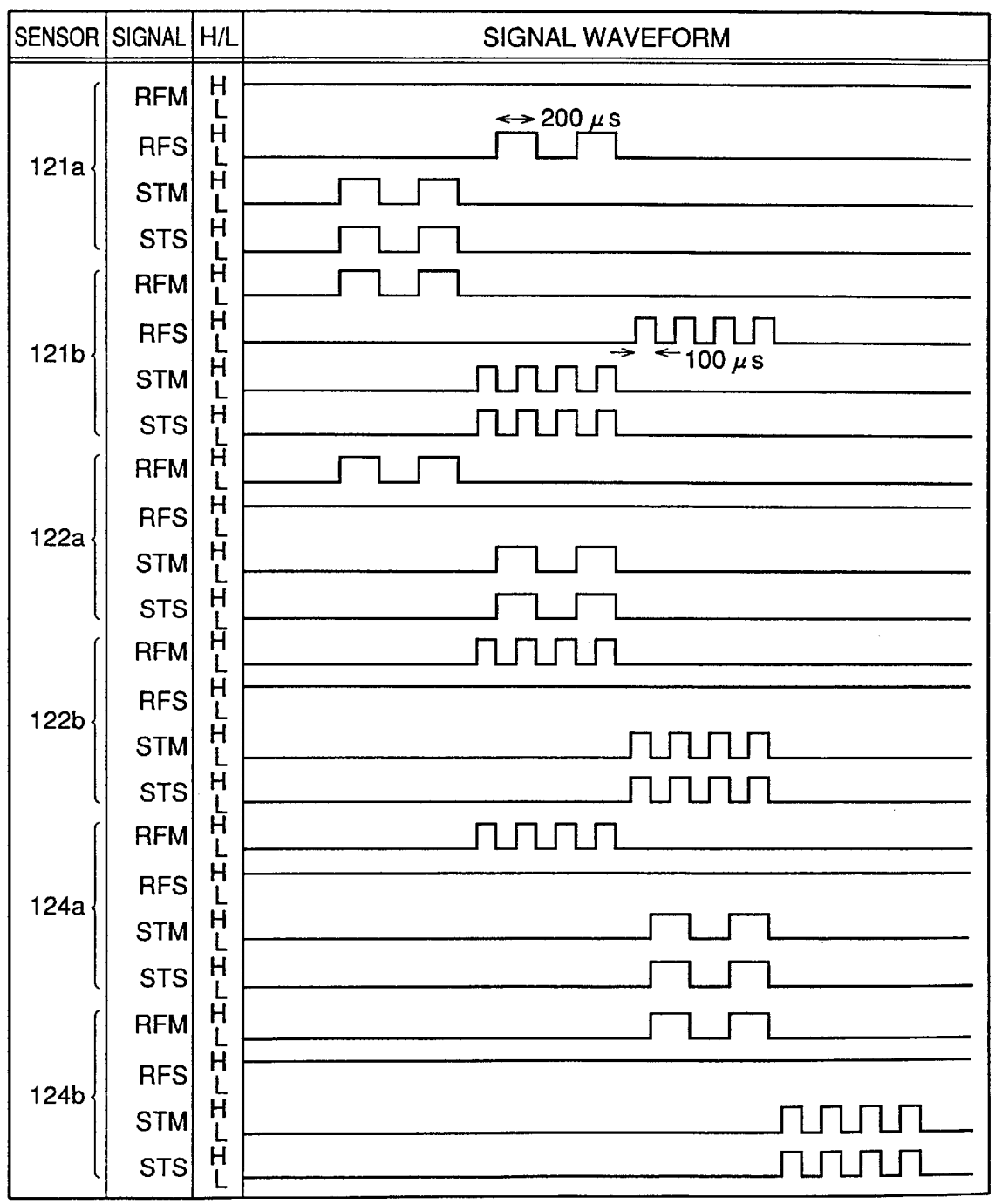
FIG. 15 is a timing chart showing timings of the operations in the connection state determination processing operation of the multi-optical axis photoelectric switch group shown in FIG. 15.

The manner of transmission/reception of the signals in the connection state determination processing in the multi-optical axis photoelectric switch group shown in FIG. 14 is now described. FIG. 15 is a timing chart showing the timings of the operations in the connection state determination processing of the multi-optical axis photoelectric switch group shown in FIG. 14. Referring to FIG. 15, there are shown the transmitting/receiving timings for various signals in the projector 121*a*, the photoreceiver 121*b*, the projector 122*a*, the photoreceiver 122*b*, the projector 124*a* and the photoreceiver 124*b*. The signals shown as to each projector and each photoreceiver are the RFM signal, the RFS signal, the STM signal and the STS signal.

Referring to FIG. 15, the STM signal for the projector is transmitted from the projector 121*a* to the photoreceiver 121*b* while the STS signal for the projector is transmitted from the projector 121*a* to the projector 122*a* by operation start of the master sensor 121, as shown at ① in FIG. 14. In response to this, the STM signal from the projector 121*a* is received as the RFM signal in the photoreceiver 121*b*. In the projector 122*a*, the STS signal from the projector 121*a* is received as the RFM signal.

Then, the photoreceiver 121*b* and the projector 122*a* perform transmission of the signals after the RFM signal is received, as shown at ② in FIG. 14. In this case, the STM for the photoreceiver is transmitted to the photoreceiver 122*b* while the STM signal for the photoreceiver is transmitted to the projector 124*a* from the photoreceiver 121*b*. From the projector 122*a*, further, the STM signal for the projector is transmitted to the projector 121*a*, while the STS signal for the projector is transmitted to the projector 123*a*.

The signals are received in response to transmission of these signals as follows: In the photoreceiver 122*b*, the STS signal from the photoreceiver 121b is received as the RFM signal. In the projector 124a, the STM signal from the photoreceiver 121b is received as the RFM signal. In the projector 121a, the STM signal from the projector 122a is received as the RFS signal. In the projector 123a, the STS signal from the projector 122a is received as the RFM signal.

Then, the photoreceiver 122b, the projector 124a and the projector 123a perform transmission of the signals after the RFM signal is received, as shown at ③ in FIG. 14. In this case, the STM signal for the photoreceiver is transmitted to the photoreceiver 121b while the STS signal for the photoreceiver is transmitted toward the photoreceiver 123b from the photoreceiver 122b. From the projector 124a, further, the STM signal for the projector is transmitted to the photoreceiver 124b, while the STS signal for the projector is transmitted toward the lower side in the series direction. From the projector 123a, in addition, the STM signal for the projector is transmitted to the projector 122a, while the STS signal for the projector is transmitted toward the lower side in the series direction.

The signals are received in response to transmission of these signals as follows: In the photoreceiver 121b, the STM signal from the photoreceiver 122b is received as the RFS signal. In the photoreceiver 123b, the STS signal from the photoreceiver 122b is received as the RFM signal. In the photoreceiver 124b, the STM signal from the projector 124a is received as the RFM signal. In the projector 122a, the STM signal from the projector 123a is received as the RFS signal.

Then, the photoreceiver 123b and the photoreceiver 124b perform transmission of the signals after the RFM signal is received, as shown at ④ in FIG. 14. In this case, the STM signal for the photoreceiver is transmitted to the photoreceiver 122b while the STS signal for the photoreceiver is transmitted toward the lower side in the series direction from the photoreceiver 123b. From the photoreceiver 124b, further, the STM signal for the photoreceiver is transmitted toward the lower side in the parallel direction, while the STS signal for the photoreceiver is transmitted toward the lower side in the series direction.

In Embodiment 3, the connection state determination processing in the multi-optical axis photoelectric switch group is performed in the operation order described above.

FIGS. 16A and 16B are diagrams showing the relation between the signals received in the signal determination parts of the multi-optical axis photoelectric switch according to Embodiment 3 and the type and connection state of the multi-optical axis photoelectric switch. FIGS. 16A and 16B correspond to FIGS. 10A and 10B described above with reference to Embodiment 2. Although master/slave of the photoreceiver cannot be confirmed, different from Embodiment 2, erroneous connection and the connection state (presence/absence of series connection) of the sensor can be determined.

Referring to FIGS. 16A and 16B, there are three types of "projector signal", "photoreceiver signal" and "absent" as to the types of the input signals in the signal receiving parts 35 and 36 respectively, similarly to the example of FIGS. 10A and 10B. Therefore, there are nine types of combinations as to the types of the input signals in the signal receiving parts 35 and 36. The determination as to whether it is a master or a slave and the determination on presence/absence of series connection as to each of these combinations are shown by 121A to 129A for the projector and by 121B to 129B for the photoreceiver.

The connection state determination processing described above is executed in power supply. Alternatively, the connection state determination processing may be executed at an arbitrary time other than that in the power supply, in response to a command by the user.

The operation when the multi-optical axis photoelectric switch group according to Embodiment 3 is generally controlled for making the same performance detecting operations will now be described. Control of the detecting operations described below may be performed by a control part independent of a connection determination part 37, or the connection determination part 37 may have a detecting operation control function other than connection determination so that the connection determination part 37 having the function performs the control.

The projector 121a of the sensor 121 which is a master sensor performs the following operations: In the multi-optical axis photoelectric switch group, the master sensor first performs detecting operations. The projector 121a of the master sensor first transmits the synchronous signal formed by a clock signal to the photoreceiver 121b. The transmission of the synchronous signal is periodically performed. Here, the transmitted synchronous signal is a signal defining the timings of the projecting operations and the photoreceiving operations of the sensors.

The projector 121a of the master sensor sequentially causes a plurality of projective elements to sequentially emit light in synchronization with the synchronous signal generated by itself and performs a series of projecting operations. After termination of the projecting operations, it transmits the synchronous signal that has been employed for the projecting operations to the projector 122a of the series-connected lower sensor 122. This synchronous signal is a signal commanding start of the projecting operations in the series-connected lower sensor and a signal defining the timings of the projecting operations in the lower sensor.

Operations of the photoreceiver 121b of the master sensor are now described. First, receiving the synchronous signal from the projector 121a of the master sensor, the photoreceiver 121b sequentially selects photodetectors in synchronization with the synchronous signal and performs a series of photoreceiving operations. Thus, photoreceiving operations synchronous with the projecting operations are performed. After termination of the photoreceiving operations, the synchronous signal that has been employed for the photoreceiving operations is transmitted to the photoreceiver 122b of the series-connected lower sensor 122. This synchronous signal is a signal commanding start of photoreceiving operation in the series-connected lower sensor and a signal defining the timings of the photoreceiving operations in the lower sensor.

Operations of the projector 122a of the slave sensor are now described. First, receiving the synchronous signal from the projector 121a of the master sensor, it starts projecting operations. The projecting operations are performed in synchronization with the received synchronous signal. After termination of a series of projecting operations, the synchronous signal that has been employed for the projecting operations is transmitted to the projector 123a of the series-connected lower sensor 123. This synchronous signal is a signal commanding start of projecting operations in the series-connected lower sensor and a signal defining the timings of the projecting operations in the lower sensor. Such operations of the projector 122a of the slave sensor are common to the projectors other than the most significant and least significant ones.

Operations of the photoreceiver 122b of the slave sensor are now described. First, receiving the synchronous signal from the photoreceiver 121b of the master sensor, it starts photoreceiving operations. The photoreceiving operations are performed in synchronization with the received synchronous signal. Thus, photoreceiving operations synchronous with the projecting operations are performed. After termination of a series of photoreceiving operations, the synchronous signal that has been employed for the photoreceiving operations is transmitted to the photoreceiver 123b of the series-connected lower sensor 123. This synchronous signal is a signal commanding start of photoreceiving operations of the series-connected lower sensor and a signal defining the timings of the photoreceiving operations in the lower sensor. Such operations of the photoreceiver 121b are operations common among the photoreceivers other than the least significant one.

Operations of the projector 123a of the least significant slave sensor are now described. First, receiving the synchronous signal from the projector 122a of the slave sensor, it starts projecting operations. The projecting operations are performed in synchronization with the received synchronous signal. After termination of a series of projecting operations, the projector 123a generates an end signal and transmits the end signal to the projector 122a on the higher side. Here, the end signal is a signal indicating that the projecting operations of the projectors of the series-connected sensors have terminated. The projector 122a receiving the end signal further transmits the end signal to the projector 121a of the master sensor. In other words, the end signal is transmitted from the least significant one to the most significant one of the sensors which are in series connection relation. The projector 121a recognizes that the projecting operations of the projectors of the series-connected sensors 121 to 123 have terminated when receiving the end signal.

Operations of the photoreceiver 123b of the least significant slave sensor are now described. First, when receiving the synchronous signal from the photoreceiver 122b on the higher side, it starts photoreceiving operations. The photoreceiving operations are performed in synchronization with the received synchronous signal. Thus, photoreceiving operations synchronous with the projecting operations are performed. After termination of a series of photoreceiving operations, an enable signal is transmitted to the photoreceiver 122b on the higher side. The enable signal is a signal for authorizing detecting operations of the parallel-connected sensor, transmitted to the most significant photoreceiver 121b through the series-connected photoreceiver (the photoreceiver 122b), and transmitted to the projector of the parallel-connected sensor further through the most significant photoreceiver 121b. Such operations of the photoreceiver 121b are operations common among the least significant photoreceiver.

While an example of controlling (authorizing) start of the projecting operations of the projector (the projector 124a) of the parallel-connected sensor on the basis of the enable signal transmitted on the side of the photoreceiver has been shown in Embodiment 3, it is not limited to this but control (authorization) of start of operations of the projector (the projector 124a) of the parallel-connected sensor may be made on the basis of the end signal transmitted on the side of the projector. In other words, control (authorization) of start of the operations of the parallel-connected projector 124a may be made in response to the projector 121a receiving the end signal.

Operations of the projector (e.g., 124a) of the parallel-connected most significant slave sensor are now described. When receiving the aforementioned enable signal, it transmits a synchronous signal formed by a clock signal to the photoreceiver 121b. The synchronous signal is individually generated by the projector of the most significant slave sensor and a signal defining timings of projecting operations and photoreceiving operations of the sensor.

The projector (e.g., 124a) of the most significant slave sensor makes a plurality of projective elements sequentially emit light in synchronization with the synchronous signal generated by itself and performs a series of projecting operations. After termination of the projecting operations, the synchronous signal that has been employed for the projecting operations is transmitted to the projector (e.g., 124a) of the series-connected lower sensor. This synchronous signal is a signal commanding start of projecting operations in the series-connected lower sensor, and a signal defining the timings of the projecting operations in the lower sensor.

The photoreceiver (e.g., 124b) of the most significant slave sensor performs operations similar to those of the aforementioned photoreceiver 121b of the aforementioned master sensor. The slave sensor series-connected to the lower side of the most significant slave sensor (e.g., 124) performs operations similar to those of the aforementioned series-connected slave sensor. When thereafter a detecting operation of the least significant sensor of the slave sensors terminates, the aforementioned enable signal is transmitted to the photoreceiver (e.g., 124b) of the most significant slave sensor, and the enable signal is further transmitted to the photoreceiver (e.g., 127b) of a subsequently parallel-connected most significant slave sensor. Then, operations similar to those of the aforementioned parallel-connected slave sensor are performed. Thus, the detecting operations, starting from the master sensor, successively proceeds to the lower direction of the series of the master sensor, and thereafter further shift to the parallel-connected slave sensors.

Such detecting operations are successively performed from the master sensor to the slave sensor of the last order, whereby detection by all sensors in the multi-optical axis photoelectric switch group is performed. In this case, the multi-optical axis photoelectric switches perform the detecting operations one by one successively from the master sensor in the multi-optical axis photoelectric switch group, whereby it is possible to prevent occurrence of the aforementioned mutual interference. Therefore, it is not necessary to perform adjustment of setting of the projection timing as to each sensor for preventing mutual interference, different from the prior art, while occurrence of mutual interference resulting from erroneous setting can be prevented, whereby mutual interference can be reliably prevented.

As hereinabove described, the connection determination part 37 further makes determinations of the types of the signals received by the respective ones of the signal receiving parts 35 and 36, and a determination as to whether or not erroneous connection is present in the manner of connection with the multi-optical axis photoelectric switch to be connected is made on the basis of the determination results.

The projectors and the photoreceivers are connected through the synchronous lines, whereby synchronization of the projecting/photoreceiving processing of the projectors and the photoreceivers can be established. When there is an erroneous connection, therefore, the user can readily find it and can make synchronization of the projecting/photoreceiving processing of the projectors and the photoreceivers, whereby the convenience for the user is improved.

According to the structure of Embodiment 3, it is possible to make determinations of higher and lower positions of the positions of the sensors in addition to the aforementioned determinations by executing sensor coupling processing described below, and it is possible to make a determination of presence/absence of parallel arrangement of the sensors by performing such processing.

Figure 17:
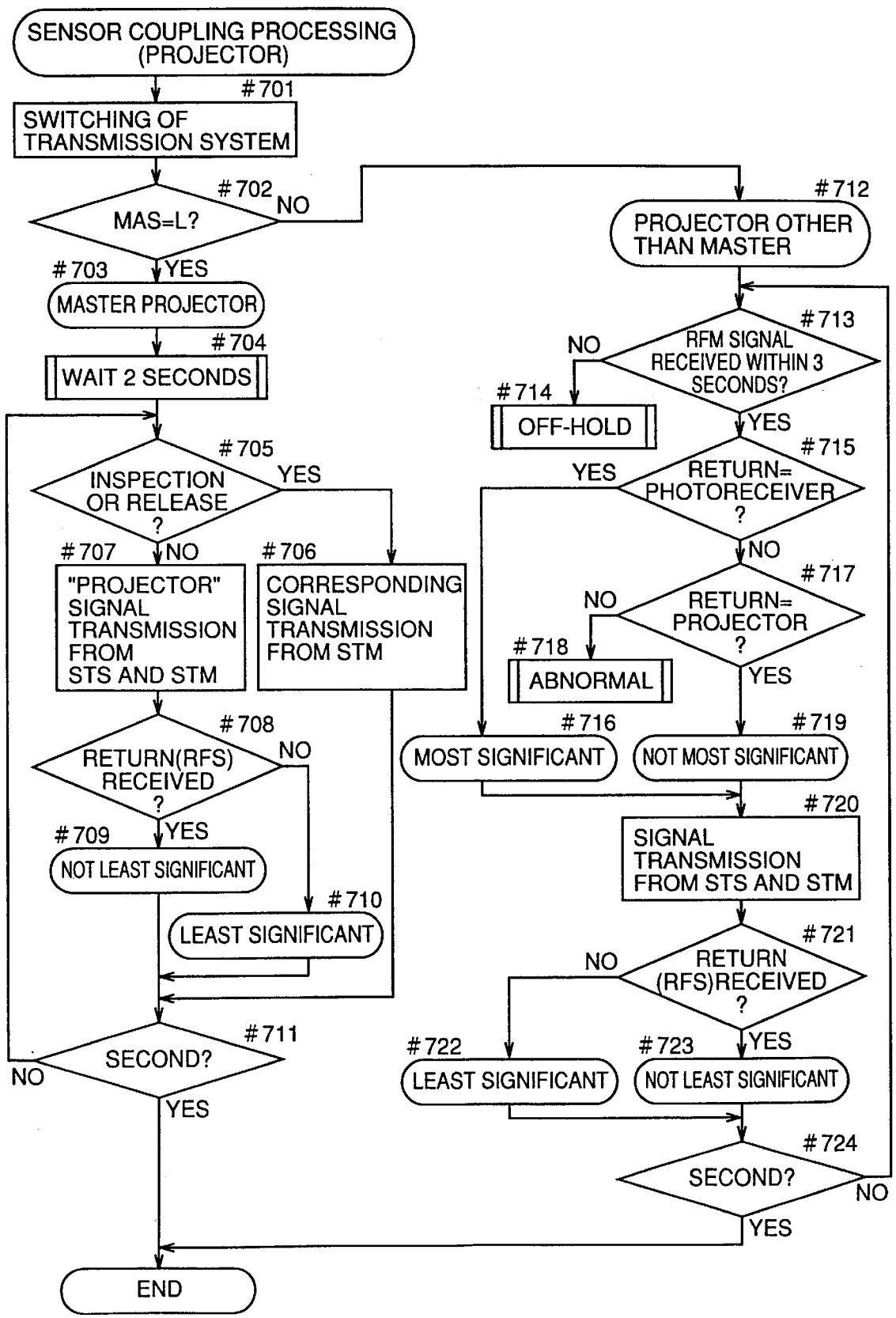
FIG. 17 is a flow chart showing the process contents of sensor coupling processing.
Figure 18:
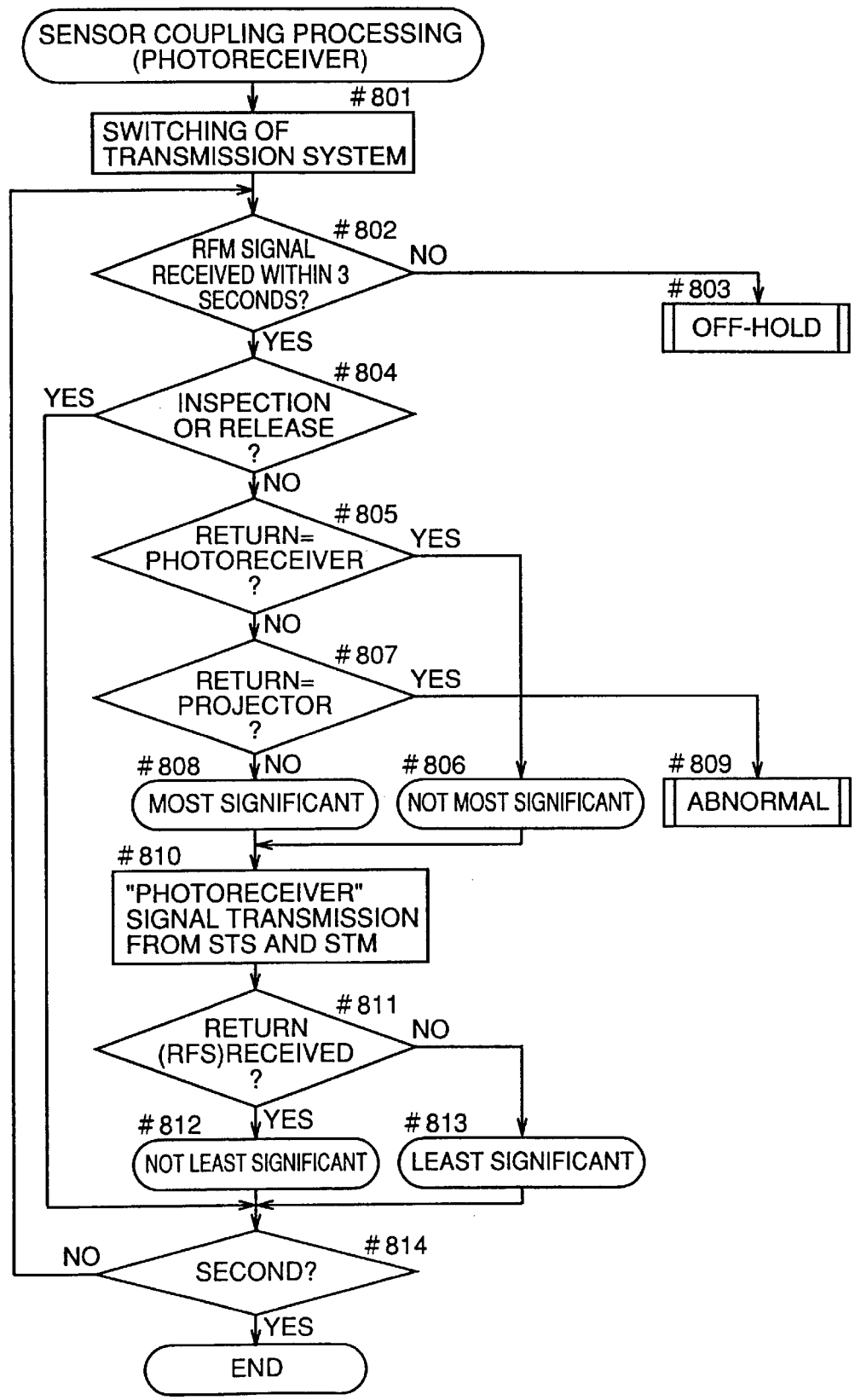
FIG. 18 is a flow chart showing the process contents of sensor coupling processing.

The sensor coupling processing is now described. FIG. 17 and FIG. 18 are flow charts showing the contents of the sensor coupling processing. Sensor coupling processing as to the projector is shown in FIG. 17, and sensor coupling processing as to the photoreceiver is shown in FIG. 18.

First, the sensor coupling processing as to the projector is described with reference to FIG. 17. First, processing of switching a control buffer of a signal transmission system for the sensor coupling processing is performed (#701). Then, a determination is made as to whether or not the master signal (MAL) is at a low level (#701). If the master signal (MAL) is determined to be low, this sensor is determined to be a master projector (#701), while this sensor is determined to be a slave projector when the master signal (MAL) is determined to be high (#712).

When determined to be the master projector, the process waits for two seconds as such (#704). This is to allow for variation of the rise of operations of other sensors connected to this sensor. Then, a determination is made as to whether or not execution of processing of a prescribed inspection program or prescribed lockout release processing is specified (#705).

If execution of processing of the inspection program or the lockout release processing is specified, processing of transmitting the STM signal corresponding to the processing to the master photoreceiver is performed (#706), and thereafter the process advances to processing of #711 described later. If execution of the processing of the inspection program or the lockout release processing is not specified, on the other hand, processing of transmitting the STM signal to the master photoreceiving while transmitting the STS signal to the projector on the lower side is performed (#707). Then, a determination is made as to whether or not there has been return of the RFS signal responding to the transmission of the STS signal from the projector on the lower side (#708).

If the RFS signal has been returned, it means that the projector is present on the lower side, and hence a determination is made that this master projector is not the least significant projector (#709). If the RFS signal is not returned, on the other hand, no projector is present on the lower side and hence a determination is made that this master projector is the least significant projector (#710). After these determinations are made, a determination is made as to whether or not the aforementioned processing following #705 is the second one (#711), and if it is not the second one, the process returns to #705 and the processing following #705 is repeated. When the second processing terminates, the sensor coupling processing of this projector terminates.

If this sensor is determined to be the slave projector as described above (#712), a determination is made as to whether or not the RFM signal has been received within three seconds (#713). If the RFM signal has not been received within three seconds, off-hold processing is executed and execution of the sensor coupling processing is inhibited (#714). Here, the off-hold processing is executed when an abnormal state where the sensor is returnable takes place, for setting the sensor in an off-hold state. In the off-hold state, a normal operation is inhibited, and error code processing, for example, is performed. When entering the off-hold state, return to the normal operation is enabled by removing the cause for the abnormality and turning the power on again. When the RFM signal is received within three seconds, on the other hand, a determination is made as to whether or not the received RFM signal is that from the photoreceiver (#715).

If the received RFM signal is determined to be one from the photoreceiver, the projector of this sensor is determined to be the projector of the most significant sensor of the slave (#716). In this case, it is the projector of the most significant sensor of the slave, and hence a determination that parallel connection is performed is also made. Thereafter the process advances to processing of #720 described later.

If the received RFM signal is determined not to be one from the photoreceiver, on the other hand, a determination is made as to whether or not the received RFM signal is that from the projector (#717).

If the received RFM signal is determined to be not from the projector, a determination is made that an abnormal state has taken place (#718). If the received RFM signal is determined to be that from the projector, on the other hand, a determination is made that this projector is not the projector of the most significant sensor (#719). Then, processing of transmitting the STM signal to the higher side while transmitting the STS signal to the lower side is performed (#720). Then, a determination is made as to whether or not the RFS signal is returned responding to the transmission of the STS signal from the projector on the lower side (#721).

If the RFS signal is not returned, no projector is present on the lower side and hence a determination is made that this projector is the projector of the least significant sensor (#722). If the RFS signal is returned, on the other hand, the projector is present on the lower side and hence a determination is made that this projector is not the projector of the least significant sensor (#723). After these determinations are made, a determination is made as to whether or not the aforementioned processing following #713 is the second one (#724), and if it is not the second one, the process returns to #713 and the processing following #713 is repeated. When the second processing terminates, the sensor coupling processing of this projector terminates.

The sensor coupling processing as to the photoreceiver is now described with reference to FIG. 18. First, processing of switching the control buffer of the signal transmission system for the sensor coupling processing is performed (#801). Then, a determination is made as to whether or not the RFM signal has been received within three seconds (#802). If no RFM signal has been received within three seconds, off-hold processing is executed and execution of the sensor coupling processing is inhibited (#803). If the RFM signal has been received within three seconds, on the other hand, a determination is made as to whether or not execution of processing of a prescribed inspection program or prescribed lockout release processing is specified (#804).

If execution of the processing of the inspection program or the lockout release processing is specified, the process advances to processing of #814 described later. If execution of the processing of the inspection program or the lockout release processing is not specified, on the other hand, a determination is made as to whether or not the received RFM signal is that from the photoreceiver (#805).

If the received RFM signal is determined to be that from the photoreceiver, the photoreceiver of this sensor is determined not to be the photoreceiver of the most significant sensor (#806). Thereafter the process advances to processing of #810 described later. If the received RFM signal is determined not to be that from the photoreceiver, on the other hand, a determination is made as to whether or not the received RFM signal is that from the projector (#807).

If the received RFM signal is determined not to be that from the projector, a determination is made that an abnormal state has taken place (#809). If the received RFM signal is determined to be that from the projector, on the other hand, a determination is made that this photoreceiver is the photoreceiver of the most significant sensor (#808). Then, processing of transmitting the STM signal to the higher side while transmitting the STS signal to the lower side is performed (#810). Then, a determination is made as to whether or not there has been return of the RFS signal responding to the transmission of the STS signal from the photoreceiver on the lower side (#811).

If the RFS signal has been returned, the photoreceiver is present on the lower side and hence a determination is made that this photoreceiver is not the photoreceiver of the least significant sensor (#812). If the RFS signal has not been returned, on the other hand, no photoreceiver is present on the lower side. In this case it is determined that this photoreceiver is the projector of the least significant sensor (#813). After these determinations are made, a determination is made as to whether or not the aforementioned processing following #802 is the second one (#814), and if it is not the second one, the process returns to #802 and the processing following #802 is repeated. When the second processing terminates, the sensor coupling processing for this photoreceiver terminates.

When the aforementioned sensor coupling processing is performed, the following position determination of higher and lower can be made. For the projector of the master sensor, two types of determinations including a determination that it is the most significant and not the least significant and a determination that it is the most significant as well as the least significant can be made. For the projector of the slave sensor, four types of determinations including a determination that it is not the most significant and not the least significant, a determination that it is the most significant and not the least significant, a determination that it is not the most significant and is the least significant, and a determination that it is the most significant as well as the least significant can be made.

For the photoreceiver, four types of determinations including a determination that it is the most significant and not the least significant, a determination that it is not the most significant and not the least significant, a determination that it is the most significant as well as the least significant, and a determination that it is not the most significant and is the least significant can be made. For the projector of the slave sensor, further, it is also possible to make a determination as to whether or not the sensor is parallel-connected.

As hereinabove described, the following effects can be attained by employing the sensor coupling processing: A set operation such as position setting of the sensor by the user can be omitted since a determination can be made in each sensor as to on which position of the higher and lower it is located, whereby the convenience for the user can be improved. Further, a set operation of presence/absence of parallel connection by the user can be omitted since a determination on presence/absence of parallel connection can be made in the sensor, whereby the convenience for the user can be improved.

In the multi-optical axis photoelectric switch according to Embodiment 3, further, the following processing for an abnormal state may be performed: The processing for a coupling abnormal state of the sensor is now described. Abnormality of the coupling state of the sensor takes place when an erroneous wiring state occurs due to erroneous connection of a wire, disconnection of a connector, and short-circuit of a connector for coupling the sensor. Further, abnormality of the coupling state of the sensor also takes place when the connector for coupling the sensor is displaced and the coupling state of the sensor changes while power is supplied after the sensor coupling processing. For such an abnormality of the coupling state of the sensor, the following processing is performed:

If the master signal is at a low level and the terminal MSI-U receives a low-level signal in the sensor coupling processing, it is regarded as erroneous wiring and an off-hold state is established. If the master signal is at a high level and the signal received by the terminal MSI-U is not a prescribed signal, an off-hold state is established.

When the RFM signal authorizing start of projection processing is not received during 4.75 ms to 5.0 ms from start of processing of the projecting operations in the case of the slave projector, an off-hold state is established. If no RFS signal has been returned from the projector connected in the lower direction within 10 $\mu$s from transmitting the STS signal authorizing start of processing of the projecting operations when there is the projector connected in the lower direction, it is regarded that the coupling state has changed, and an off-hold state is established.

If no RFS signal has been inputted from the sensor on the lower side between termination of the processing of the projecting operations and start of processing of next projecting operations in the case of the most significant projector and the projector other than the least significant one, it is regarded that the coupling state has changed and an off-hold state is established.

When it is the master projector, the level of the RFM signal received by the terminal MSI-U is periodically confirmed. If the level is low, it is regarded as erroneous wiring and an off-hold state is established. When it is the least significant projector, the level of the RFS signal received by the terminal MSI-L is periodically confirmed. If the level is low, it is regarded as erroneous wiring and an off-hold state is established.

If an RFM signal authorizing start of photoreceiving processing is not received during 4.75 ms to 5.0 ms from start of processing of the photoreceiving operations when it is a photoreceiver, an off-hold state is established. If no RFS signal has been returned from the projector connected in the lower direction within 10 $\mu$s from transmitting the STS signal authorizing start of processing made by the photoreceiver when there is the photoreceiver connected in the lower direction, it is regarded that the coupling state has changed and an off-hold state is established.

If transmission of the synchronous signal from the projector does not stop simultaneously with termination of the processing of the photoreceiving operations when it is the least significant photoreceiver, it is regarded that some abnormality has occurred in the projector and an off-hold state is established. When it is the least significant photoreceiver, the level of the RFS signal received by the terminal MSI-L is periodically confirmed. If the level is low, it is regarded as erroneous wiring and an offhold state is established.

The value of the RFM signal is read when it is the master projector, and if the level thereof is low, it is regarded that the connection state of the sensor has changed and determined as abnormal connection of the wire. The determination of the level of the signal to be determined in this case is made a plurality of times to make a majority determination. When abnormal connection of the wire is continuously determined in two or more cycles of the determination processing, an off-hold state is established.

The value of the RFS signal is read when it is the least significant sensor, and if the level is low, it is regarded that the connection state of the sensor has changed and determined to be abnormal. The determination of the level of the signal to be determined in this case is made a plurality of times to make a majority determination. When an abnormal connection of the wire is continuously determined in two or more cycles of the determination processing, an off-hold state is established.

The value of an object detection signal received from the lower side is read when it is the least significant sensor, and if the level thereof is high (the level in a case of detecting an object), it is regarded that the connection state of the sensor has been changed and determined as abnormal. The determination of the level of the signal to be determined in this case is made a plurality of times to make a majority determination. When an abnormal connection of the wire is continuously determined in two or more cycles of the determination processing, an off-hold state is established.

Execution of the detecting operation while the abnormal state occurs is prevented so that no erroneous detection result can be obtained by performing the aforementioned detection of abnormality of the connection state and the processing for the occurrence of the abnormality.

Figure 19:
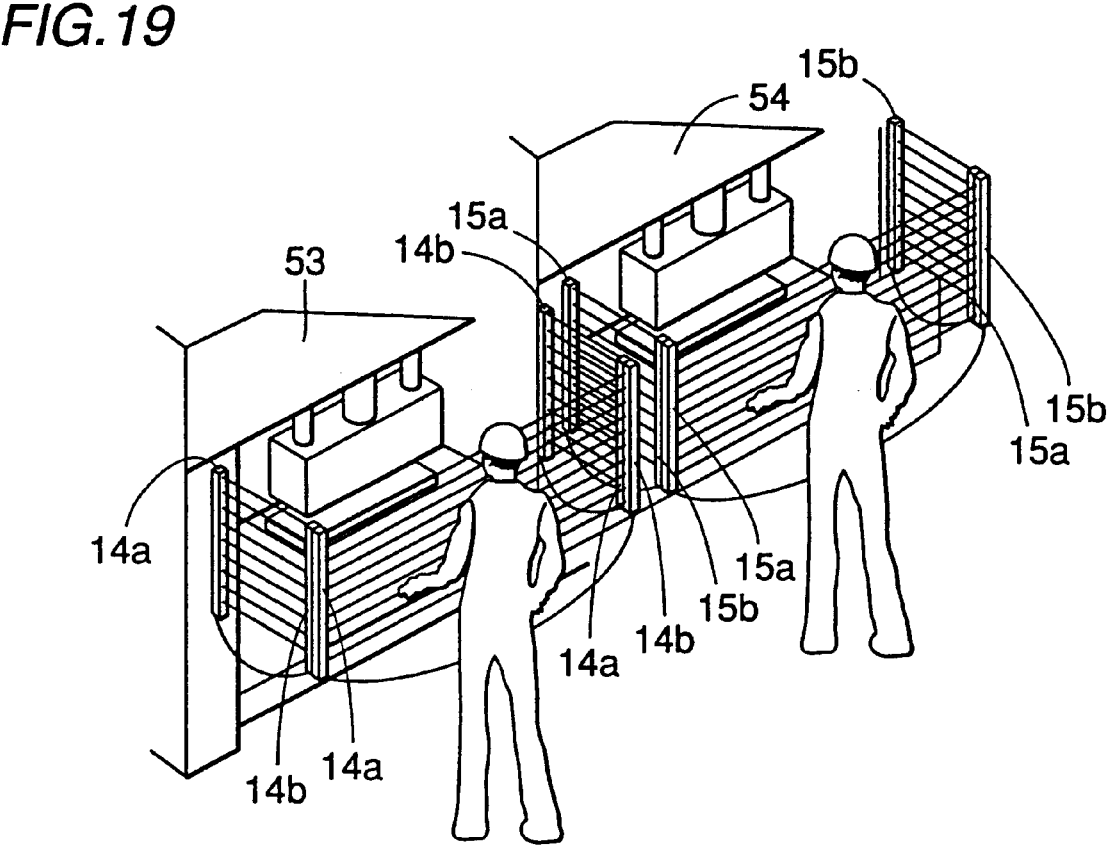
FIG. 19 is a perspective view illustrating a specific example of use of a multi-optical axis photoelectric switch group structured by series and parallel connections.

In Embodiments 1 to 3 described above, the case where the multi-optical axis photoelectric switch group is formed by the plurality of multi-optical axis photoelectric switches connected in series and in parallel has been shown. A specific example of a unit which can utilize such a multi-optical axis photoelectric switch group is now described. FIG. 19 is a perspective view showing a specific example of use of a multi-optical axis photoelectric switch group connected in series and in parallel. In FIG. 19, there is shown an example of use employing series-connected multi-optical axis photoelectric switches and parallel-connected multi-optical axis photoelectric switches in combination.

On the front side of each of two working units 53 and 54 individually performing operations such as working of material, a multi-optical axis photoelectric switch group is provided. On the side of the working unit 53, a plurality of multi-optical axis photoelectric switches formed by projectors 14a and photoreceivers 14b are series-connected in a manner surrounding a working area, and a detection area is formed by this series connection. On the side of the working unit 54, a plurality of multi-optical axis photoelectric switches formed by projectors 15a and photoreceivers 15b are series-connected in a manner surrounding a working area as in the case of the working unit 53, and a detection area is formed by this series connection. In this case, the multi-optical axis photoelectric switches on the side of the working unit 53 and the multi-optical axis photoelectric switches on the side of the working unit 54 are parallel-connected. The multi-optical axis photoelectric switches in this case are parallel-connected, and an object detection signal is outputted from the photoreceiver of one of the multi-optical axis photoelectric switches of each working unit. In this case, a connection system combining a series connection system and a parallel connection system is suitable. This is because it is not efficient to perform a risk avoiding operation also in the other working unit when an object is detected in one working unit since the working units 53 and 54 individually perform operations, and further, each working area of the working units 53 and 54 must perform detection employing the series connection system since the object is detected by a plurality of multi-optical axis photoelectric switches. Thus, the multi-optical axis photoelectric switch group connected in series and in parallel can be utilized for the working units shown in FIG. 19, for example.

In the aforementioned multi-optical axis photoelectric switch group, a decision as to whether it is a master sensor or a slave sensor may be made by the following decision method: A master set switch is provided on each sensor, setting that it is a master sensor. A sensor set by this master set switch that it is the master sensor recognizes that it is the master sensor. Namely, that it is the master sensor is decided on the basis of manipulation of the master set switch. In this case, the master sensor may be on any position in the multi-optical axis photoelectric switch group. A sensor not set by the master set switch that it is a master sensor exchanges signals with sensors on the higher side and the lower side similarly to each sensor described above, and decides that it is a slave sensor on the basis of the manner of receiving of the signals. Thus, any sensor on any position can be the master sensor. Further, no complicated operation is necessary since each sensor decides that it is the slave sensor, whereby the convenience for the user can be improved.

While the description has been made with reference to such a transmission type multi-optical axis photoelectric switch that the projector and the photoreceiver are different bodies in relation to Embodiment 1 to Embodiment 3, it is not limited to this but may be such a reflecting type multi-optical axis photoelectric switch that a projector and a photoreceiver are the same body.

As to the application field of the present invention, it can also be applied to a time difference traffic signal system setting a signal at every crossing of a network of roads covering all directions and performing switch control of signals providing time difference between the respective signals in the north-south directions and the east-west directions, for example, in addition to the multi-optical axis photoelectric switch. In order to generally control an operating unit group formed by a matrix of signals set on respective crossings, a signal located on a predetermined start position (e.g., south end and east end) among the plurality of matrix signals is determined as a master signal and the remaining signal is determined as a slave signal in this case.

As another utilization field, it is conceivable, in order to generally control/drive a plurality of robots working in a factory, for example, to set a robot located on a certain position as a master robot while setting the remaining robot as a slave robot.

In the general control method and the control apparatus therefor in the embodiments described above, no centralized management control is made by a centralized management computer or the like for general operation control at the center, but regular operation control of the operating unit group as a whole is performed while respective operating units perform transverse communication with each other, whereby, when a certain operating unit in the said operating unit group is to be removed or contrarily expanding the operating units, it is not necessary to report and register it to the centralized management computer, and there is such an advantage that it is possible to readily and flexibly deal with removal or extension.

What is claimed is:

1. A control unit provided, in order to generally control a group of a plurality of operating units performing a certain operation formed connectable in series or in parallel as a whole to enable regular operation control, on each of said plurality of operating units, said control unit comprising:

communication means for communicating with an adjacent of said operating units;

start position determination means for determining whether or not the operating unit is located on a predetermined start position as the most significant position of control order in the series connection or the parallel connection serving as a start point of general control in said operating unit group on the basis of relative positional relation obtained as a result of performing a communicating operation by said communication means; and master/slave decision means for deciding that said operating unit provided with said control unit is to be a master operating unit when it is determined by said start position determination means that the operating unit is located on the start position and deciding that the operating unit provided with said control unit is to be a slave operating unit operating dependently on said master operating unit when it is determined by said start position determination means that the operating unit is not located on the start position, wherein said communication means includes:

first signal output means for outputting a first signal toward the control unit of the operating unit connectable in series, second signal output means for outputting a second signal toward the control unit of the operating unit connectable in series or in parallel, first signal input means for receiving, when connected in series to the control unit of the operating unit directed to said connection, said first signal from the control unit, and second signal input means for receiving, when connected in series or in parallel to the control unit of the operating unit directed to said connection, said second signal from the control unit;

said start position determination means determines whether or not said first signal input means has received said first signal and determines whether or not said second signal input means has received said second signal, and said master/slave decision means decides that the operating unit is to be either said master operating unit or said slave operating unit on the basis of a determination result of the start position determination means, wherein said start position determination means further makes a determination of the type of a signal received by said first signal input means and further makes a determination of the type of a signal received by said second signal input means, said control unit further comprising erroneous connection determination means for making a determination as to whether or not an erroneous connection is present in the manner of connection with the control unit of the operating unit as the object of said connection on the basis of a determination result of the signal received by said first signal input means and a determination result of the signal received by said second signal input means.

2. A control unit provided, in order to generally control a group of a plurality of operating units performing a certain operation formed connectable in series or in parallel as a whole to enable regular operation control in accordance with a prescribed control order, on each of said plurality of operating units, said control unit comprising:

first transmitting/receiving means connectable to the operating unit on a higher side of said control order for performing transmission/reception of a signal to/from the operating unit on the higher side;

second transmitting/receiving means connectable to the operating unit on a lower side of said control order for performing transmission/reception of a signal to/from the operating unit on the lower side; and determination means for determining whether or not the unit is connected with the operating unit on the higher side on the basis of a manner of reception of the signal by said first transmitting/receiving means and determining whether or not the unit is connected with the operating unit on the lower side on the basis of a manner of reception of the signal by said second transmitting/receiving means, wherein said determination means further makes a determination as to whether the operating unit connected to the respective ones of the higher side and the lower side of said control order is connected in series or connected in parallel on the basis of the manner of reception of the signals by said first and second transmitting/receiving means.

3. A control unit provided, in order to generally control a group of a plurality of operating units performing a certain operation as a whole to enable regular operation control in accordance with a prescribed control order, on each of said plurality of operating units, said control unit comprising:

first transmitting/receiving means connectable to the operating unit on a higher side of said control order for performing transmission/reception of a signal to/from the operating unit on the higher side;

second transmitting/receiving means connectable to the operating unit on a lower side of said control order for performing transmission/reception of a signal to/from the operating unit on the lower side;

determination means for determining whether or not the unit is connected with the operating unit on the higher side on the basis of a manner of reception of the signal by said first transmitting/receiving means and determining whether or not the unit is connected with the operating unit on the lower side on the basis of a manner of reception of the signal by said second transmitting/receiving means;

start position determination means for determining whether or not the unit is located on a predetermined start position serving as a start point of general control in said operating unit group on the basis of a determination result by said determination means as to whether or not the unit is connected with the operating unit on the higher side; and master/slave decision means for deciding that said operating unit provided with said control unit is to be a master operating unit when it is determined by said start position determination means that the operating unit is located on the start position and deciding the operating unit provided with said control unit is to be a slave operating unit operating dependently on said master operating unit when it is determined by said start position determination means that the operating unit is not located on the start position.

4. A control unit provided, in order to generally control a group of a plurality of operating units performing a similar operation as a whole to enable regular operation control, on each of said plurality of operating units, said control unit comprising:

control signal transmitting means for transmitting a control signal for performing said general operation control to another connected operating unit, wherein said control signal transmitting means transmits a first control signal for performing said general operation control when said another operating unit is connected in series and transmits a second control signal for performing said general operation control when said another operating unit is connected in parallel.

5. A control unit provided, in order to generally control a group of a plurality of operating units performing a certain operation as a whole connected in series or in parallel to enable regular operation control in accordance with a prescribed control order, on each of said plurality of operating units, said control unit comprising:

signal transmitting/receiving means for performing transmitting/receiving of respective ones of a control signal transmitted to the operating unit on a lower side of said control order for commanding an operation of the operating unit on the lower side of said control order and an authorization signal transmitted to the operating unit on a higher side of said control order for authorizing an operation of the operating unit connected in parallel with respect to the remaining connected operating units for said integrated operation control; and operation control means for controlling such that said certain operation is executed when said signal transmitting/receiving means receives said control signal from the higher side of said control order, wherein said signal transmitting/receiving means further transmits said control signal to the operating unit on the lower side after the operation controlled by said operation control means in response to said control signal from the operating unit on the higher side terminates when the operating unit is connected in series on the lower side of said control order, and transmits said authorization signal to the operating unit on the higher side after the operation controlled by said operation control means terminates when the operating unit is not connected in series on the lower side of said control order.

6. A control unit provided, in order to generally control a group of a plurality of operating units performing a certain operation as a whole connected in series or in parallel to enable regular operation control in accordance with a prescribed control order, on each of said plurality of operating units, said control unit comprising:

signal transmitting/receiving means for performing transmission/reception of respective ones of a control signal transmitted to the operating unit on a lower side of said control order for commanding an operation of the operating unit on the lower side of said control order and an authorization signal transmitted to the operating unit on a higher side of said control order for authorizing an operation of the operating unit connected in parallel with respect to the remaining connected operating units for said integrated operation control; and operation control means controlling such that said certain operation is executed when said signal transmitting/receiving means receives said control signal from the higher side of said control order, wherein said signal transmitting/receiving means further transmits said control signal to the operating unit on the lower side after the operation controlled by said operation control means in response to said control signal from the operating unit on the higher side terminates, and further transmits said authorization signal to the operating unit on the higher side in response reception of said authorization signal from the operating unit on the lower side of said control order when the operating unit is connected in series on the higher side and the lower side of said control order.

7. A control unit provided, in order to generally control a group of a plurality of operating units performing a certain operation formed connectable in series or in parallel as a whole to enable regular operation control, on each of said plurality of operating units, said control unit comprising:

communication means for communicating with an adjacent of said operating units;

start position determination means for determining whether or not the operating unit is located on a predetermined start position as the most significant position of control order in the series connection or the parallel connection serving as a start point of general control in said operating unit group on the basis of relative positional relation obtained as a result of performing a communicating operation by said communication means; and master/slave decision means for deciding that said operating unit provided with said control unit is to be a master operating unit when it is determined by said start position determination means that the operating unit is located on the start position and deciding that the operating unit provided with said control unit is to be a slave operating unit operating dependently on said master operating unit when it is determined by said start position determination means that the operating unit is not located on the start position, wherein said communication means includes:

first signal output means for outputting a first signal toward the control unit of the operating unit connectable in series, second signal output means for outputting a second signal toward the control unit of the operating unit connectable in series or in parallel, first signal input means for receiving, when connected in series to the control unit of the operating unit directed to said connection, said first signal from the control unit, and second signal input means for receiving, when connected in series or in parallel to the control unit of the operating unit directed to said connection, said second signal from the control unit;

said start position determination means determines whether or not said first signal input means has received said first signal and determines whether or not said second signal input means has received said second signal, and said master/slave decision means decides that the operating unit is to be either said master operating unit or said slave operating unit on the basis of a determination result of the start position determination means, wherein the operation units performing a certain operation are multi-optical axis photoelectric switches.

8. The control unit according to claim 5, wherein the operating units performing a certain operation are multi-optical axis photoelectric switches.

9. The control unit according to claim 3, wherein the operating units performing a certain operation are multi-optical axis photoelectric switches.

10. The control unit according to claim 4, wherein the operating units performing a similar operation are multi-optical axis photoelectric switches.

11. The control unit according to claim 3, wherein the operating units performing a certain operation are multi-optical axis photoelectric switches.

12. The control unit according to claim 6, wherein the operating units performing a certain operation are multi-optical axis photoelectric switches.

\* \* \* \* \*